US007837545B2

(12) United States Patent
Blair, Jr. et al.

(10) Patent No.: US 7,837,545 B2
(45) Date of Patent: Nov. 23, 2010

(54) GAMING DEVICE HAVING AN INTERACTIVE POKER GAME WITH PREDETERMINED OUTCOMES

(75) Inventors: Robert R. Blair, Jr., Reno, NV (US); Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 1594 days.

(21) Appl. No.: 10/934,258

(22) Filed: Sep. 3, 2004

(65) Prior Publication Data

US 2006/0052148 A1 Mar. 9, 2006

(51) Int. Cl.
*A63F 9/24* (2006.01)
*A63F 13/00* (2006.01)

(52) U.S. Cl. .............................. 463/13; 463/20; 463/26

(58) Field of Classification Search .................. 463/13, 463/25–26, 16–20
See application file for complete search history.

(56) References Cited

U.S. PATENT DOCUMENTS

| | | | |
|---|---|---|---|
| 3,628,259 | A | 12/1971 | Kahn |
| 4,156,976 | A | 6/1979 | Mikun |
| 4,157,829 | A | 6/1979 | Goldman et al. |
| 4,332,389 | A | 6/1982 | Loyd et al. |
| 4,335,809 | A | 6/1982 | Wain |
| 4,339,798 | A | 7/1982 | Hedges et al. |
| 4,365,810 | A | 12/1982 | Richardson |
| 4,373,726 | A | 2/1983 | Churchill et al. |
| 4,448,419 | A | 5/1984 | Telnaes |
| 4,455,025 | A | 6/1984 | Itkis |
| 4,467,424 | A | 8/1984 | Hedges et al. |
| 4,494,197 | A | 1/1985 | Troy et al. |
| 4,527,798 | A | 7/1985 | Siekierski et al. |
| 4,582,324 | A | 4/1986 | Koza et al. |
| 4,624,462 | A | 11/1986 | Itkis |
| 4,636,951 | A | 1/1987 | Harlick |
| 4,652,998 | A | 3/1987 | Koza et al. |

(Continued)

FOREIGN PATENT DOCUMENTS

| | | |
|---|---|---|
| WO | WO 02097749 | 12/2002 |

OTHER PUBLICATIONS

Diamonopoly Advertisement by International Gamco, Inc., published 2002.

(Continued)

*Primary Examiner*—Dmitry Suhol
*Assistant Examiner*—Jasson H Yoo
(74) *Attorney, Agent, or Firm*—K&L Gates LLP

(57) ABSTRACT

An interactive poker game which provides a predetermined outcome to a player. In one embodiment, the player and at least one gaming device generated competitor or dealer are provided a plurality of cards. The gaming device generated competitors then place one or more bets into a community pot, wherein if the predetermined outcome is a win associated with a value, the amount placed into the community pot equals the value associated with the win outcome. The player is enabled to replace one or more of their provided cards with new cards and based on the player's cards and the predetermined game outcome, the gaming device determines for each generated competitor which playing cards to replace and the new cards provided. The player's hand is compared to each of the dynamic gaming device generated competitors as opposed to a static paytable and the predetermined outcome is provided to the player.

86 Claims, 10 Drawing Sheets

U.S. PATENT DOCUMENTS 4,669,730 A 6/1987 Small
4,689,742 A 8/1987 Troy et al.
4,798,387 A 1/1989 Richardson
4,805,907 A 2/1989 Hagiwara
4,815,741 A 3/1989 Small
4,817,951 A 4/1989 Crouch et al.
4,842,278 A 6/1989 Markowicz
4,848,771 A 7/1989 Richardson
4,856,787 A 8/1989 Itkis
4,880,237 A 11/1989 Kishishita
4,882,473 A 11/1989 Bergeron et al.
4,982,337 A 1/1991 Burr et al.
5,007,649 A 4/1991 Richardson
5,011,159 A 4/1991 Fortunato et al.
5,042,809 A 8/1991 Richardson
5,092,598 A 3/1992 Kamille
5,100,137 A 3/1992 Fulton
5,119,295 A 6/1992 Kapur
5,158,293 A 10/1992 Mullins
5,167,413 A 12/1992 Fulton
5,223,698 A 6/1993 Kapur
5,224,706 A 7/1993 Bridgeman et al.
5,265,874 A 11/1993 Dickinson et al.
5,275,400 A 1/1994 Weingardt et al.
5,276,312 A 1/1994 McCarthy
5,282,620 A 2/1994 Keesee
5,294,120 A 3/1994 Schultz
5,294,128 A 3/1994 Marquez
5,297,802 A 3/1994 Pocock et al.
5,324,035 A 6/1994 Morris et al.
5,326,104 A 7/1994 Pease et al.
5,348,299 A 9/1994 Clapper, Jr.
5,351,970 A 10/1994 Fioretti
5,377,975 A 1/1995 Clapper, Jr.
5,393,061 A 2/1995 Manship et al.
5,398,932 A 3/1995 Eberhardt et al.
5,401,023 A 3/1995 Wood
5,407,199 A 4/1995 Gumina
5,476,259 A 12/1995 Weingardt
5,487,544 A 1/1996 Clapper, Jr.
5,489,101 A 2/1996 Moody
5,511,781 A 4/1996 Wood et al.
5,531,448 A 7/1996 Moody
5,536,008 A 7/1996 Clapper, Jr.
5,542,669 A 8/1996 Charron et al.
5,562,284 A 10/1996 Stevens
5,564,701 A 10/1996 Dettor
5,570,885 A 11/1996 Ornstein
5,580,311 A 12/1996 Haste, III
5,584,486 A 12/1996 Franklin
5,593,161 A 1/1997 Boylan et al.
5,595,538 A 1/1997 Haste, III
5,609,337 A 3/1997 Clapper, Jr.
5,628,684 A 5/1997 Boudec
5,630,754 A 5/1997 Rebane
5,645,485 A 7/1997 Clapper, Jr.
5,657,899 A 8/1997 Stoken
5,674,128 A 10/1997 Holch et al.
5,678,001 A 10/1997 Nagel et al.
5,697,843 A 12/1997 Manship et al.
5,707,285 A 1/1998 Place et al.
5,711,715 A 1/1998 Ringo et al.
5,718,431 A 2/1998 Ornstein
5,720,483 A 2/1998 Trinh
5,722,891 A 3/1998 Inoue
5,732,950 A 3/1998 Moody
5,735,432 A 4/1998 Stoken et al.
5,749,784 A 5/1998 Clapper, Jr.
5,775,692 A 7/1998 Watts et al.
5,779,545 A 7/1998 Berg et al.
5,779,547 A 7/1998 SoRelle et al.
5,791,987 A 8/1998 Chen et al.
5,800,269 A 9/1998 Holch et al.
5,810,664 A 9/1998 Clapper, Jr.
5,816,916 A 10/1998 Moody
5,823,873 A 10/1998 Moody
5,823,874 A 10/1998 Adams
5,830,067 A 11/1998 Graves et al.
5,848,932 A 12/1998 Adams
5,855,515 A 1/1999 Pease et al.
5,868,619 A 2/1999 Wood et al.
5,871,398 A 2/1999 Schneier et al.
5,876,283 A 3/1999 Parra et al.
5,882,258 A 3/1999 Kelly et al.
5,882,260 A 3/1999 Marks et al.
5,915,588 A 6/1999 Stoken et al.
5,928,082 A 7/1999 Clapper, Jr.
5,941,771 A 8/1999 Haste, III
5,944,606 A 8/1999 Gerow
5,949,042 A 9/1999 Dietz, II et al.
5,954,335 A 9/1999 Moody
5,954,582 A 9/1999 Zach
5,976,016 A 11/1999 Moody et al.
5,980,385 A 11/1999 Clapper, Jr.
5,984,779 A 11/1999 Bridgeman et al.
6,007,066 A 12/1999 Moody
6,007,424 A 12/1999 Evers et al.
6,012,720 A 1/2000 Webb
6,012,981 A 1/2000 Fujioka et al.
6,012,984 A 1/2000 Roseman
6,017,032 A 1/2000 Grippo et al.
6,024,640 A 2/2000 Walker et al.
6,056,289 A 5/2000 Clapper, Jr.
6,062,980 A 5/2000 Luciano
6,062,981 A 5/2000 Luciano, Jr.
6,089,982 A 7/2000 Holch et al.
6,093,100 A 7/2000 Singer et al.
6,098,985 A 8/2000 Moody
6,120,024 A 9/2000 Lind
6,120,378 A 9/2000 Moody et al.
6,126,541 A 10/2000 Fuchs
6,126,542 A 10/2000 Fier
6,132,311 A 10/2000 Williams
6,146,271 A 11/2000 Kadlic
6,146,272 A 11/2000 Walker et al.
6,149,521 A 11/2000 Sanduski
6,155,925 A 12/2000 Giobbi et al.
6,159,095 A 12/2000 Frohm et al.
6,168,521 B1 1/2001 Luciano et al.
6,174,233 B1 1/2001 Sunaga et al.
6,183,361 B1 2/2001 Cummings et al.
6,190,255 B1 2/2001 Thomas et al.
6,196,547 B1 * 3/2001 Pascal et al. ................ 273/292
6,203,429 B1 3/2001 Demar et al.
6,210,275 B1 4/2001 Olsen
6,210,276 B1 4/2001 Mullins
6,217,448 B1 4/2001 Olsen
6,220,961 B1 4/2001 Keane et al.
6,241,606 B1 6/2001 Riendeau et al.
6,254,480 B1 7/2001 Zach
6,273,820 B1 8/2001 Haste, III
6,280,325 B1 8/2001 Fisk
6,280,328 B1 8/2001 Holch et al.
6,302,791 B1 10/2001 Frohm et al.
6,306,038 B1 10/2001 Graves et al.
6,309,298 B1 10/2001 Gerow
6,312,334 B1 11/2001 Yoseloff
6,315,289 B1 11/2001 Sakamoto et al.
6,325,716 B1 12/2001 Walker et al.
6,358,150 B1 3/2002 Mir et al.
6,358,151 B1 3/2002 Enzminger et al.
6,368,218 B2 4/2002 Angell, Jr.
6,386,977 B1 5/2002 Hole
6,402,614 B1 6/2002 Schneier et al.

| | | | | |
|---|---|---|---|---|
| 6,419,583 | B1 | 7/2002 | Crumby et al. | |
| 6,425,824 | B1 | 7/2002 | Baerlocher et al. | |
| 6,447,395 | B1 | 9/2002 | Stevens | |
| 6,450,885 | B2 | 9/2002 | Schneier et al. | |
| 6,454,648 | B1 | 9/2002 | Kelly et al. | |
| RE37,885 | E | 10/2002 | Acres et al. | |
| 6,471,591 | B1 | 10/2002 | Crumby | |
| 6,475,086 | B2 | 11/2002 | Zach | |
| 6,508,711 | B1 | 1/2003 | Ono | |
| 6,524,184 | B1 | 2/2003 | Lind et al. | |
| 6,524,185 | B2 | 2/2003 | Lind | |
| 6,527,638 | B1 | 3/2003 | Walker et al. | |
| 6,533,664 | B1 | 3/2003 | Crumby | |
| 6,537,150 | B1 * | 3/2003 | Luciano et al. | 463/16 |
| 6,569,017 | B2 | 5/2003 | Enzminger et al. | |
| 6,599,187 | B2 | 7/2003 | Gerow | |
| 6,607,439 | B2 | 8/2003 | Schneier et al. | |
| 6,609,974 | B2 | 8/2003 | Mead et al. | |
| 6,612,927 | B1 | 9/2003 | Slomiany et al. | |
| 6,619,660 | B2 | 9/2003 | Schaefer et al. | |
| 6,656,040 | B1 | 12/2003 | Brosnan et al. | |
| 6,656,044 | B1 | 12/2003 | Lewis | |
| 6,676,126 | B1 | 1/2004 | Walker et al. | |
| 6,685,562 | B1 | 2/2004 | Rantanen | |
| 6,695,695 | B2 | 2/2004 | Angel | |
| 6,729,621 | B2 | 5/2004 | Moody | |
| 6,729,961 | B1 * | 5/2004 | Millerschone | 463/30 |
| 6,733,385 | B1 | 5/2004 | Enzminger et al. | |
| 6,749,500 | B1 | 6/2004 | Nelson et al. | |
| 2002/0010013 | A1 | 1/2002 | Walker et al. | |
| 2002/0039917 | A1 | 4/2002 | Armstrong et al. | |
| 2002/0077173 | A1 | 6/2002 | Luciano et al. | |
| 2002/0077174 | A1 | 6/2002 | Luciano et al. | |
| 2002/0082070 | A1 | 6/2002 | Macke et al. | |
| 2002/0082071 | A1 | 6/2002 | Riendeau et al. | |
| 2002/0082085 | A1 | 6/2002 | Osterer | |
| 2002/0090986 | A1 | 7/2002 | Cote et al. | |
| 2002/0094871 | A1 | 7/2002 | Luciano et al. | |
| 2002/0098882 | A1 | 7/2002 | Lind et al. | |
| 2002/0098883 | A1 | 7/2002 | Packes, Jr. et al. | |
| 2002/0111207 | A1 | 8/2002 | Lind et al. | |
| 2002/0111214 | A1 | 8/2002 | Lind et al. | |
| 2002/0113369 | A1 | 8/2002 | Weingardt | |
| 2002/0132661 | A1 | 9/2002 | Lind et al. | |
| 2002/0132666 | A1 | 9/2002 | Lind et al. | |
| 2002/0196342 | A1 | 12/2002 | Walker et al. | |
| 2003/0060257 | A1 | 3/2003 | Katz et al. | |
| 2003/0060261 | A1 | 3/2003 | Katz et al. | |
| 2003/0060276 | A1 | 3/2003 | Walker et al. | |
| 2003/0100371 | A1 | 5/2003 | Gatto et al. | |
| 2003/0100372 | A1 | 5/2003 | Gatto et al. | |
| 2003/0125101 | A1 | 7/2003 | Campo | |
| 2003/0134670 | A1 * | 7/2003 | Kilby | 463/13 |
| 2003/0181231 | A1 | 9/2003 | Vancura et al. | |
| 2003/0190943 | A1 | 10/2003 | Walker et al. | |
| 2003/0211884 | A1 | 11/2003 | Gauselmann | |
| 2004/0014515 | A1 | 1/2004 | Tracy et al. | |
| 2004/0036212 | A1 | 2/2004 | Walker et al. | |
| 2004/0038723 | A1 | 2/2004 | Schneier et al. | |
| 2004/0259621 | A1 * | 12/2004 | Pfeiffer et al. | 463/13 |

OTHER PUBLICATIONS

Electronic Pull Tabs Advertisement by 21st Century Gaming, published prior to 2002.

Lucky Times California Lottery Newsletter published 1996.

Instant Winner Advertisement by Williams/WMS Gaming, published prior to 2002.

Play it again Advertisement by International Gamco, Inc., published 2000.

* cited by examiner

16

16

GAMING DEVICE HAVING AN INTERACTIVE POKER GAME WITH PREDETERMINED OUTCOMES

CROSS-REFERENCE TO RELATED APPLICATIONS

This application relates to the following co-pending commonly owned patent applications: "GAMING DEVICE INCLUDING OUTCOME POOLS FOR PROVIDING GAME OUTCOMES," Ser. No. 10/261,744, "APPARATUS AND METHOD FOR GENERATING A POOL OF SEEDS FOR A CENTRAL DETERMINATION GAMING SYSTEM," Ser. No. 10/371,722, "CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME," Ser. No. 10/371,723, "CENTRAL DETERMINATION GAMING SYSTEM WHERE THE SAME SEED IS USED TO GENERATE THE OUTCOMES FOR A PRIMARY GAME AND A SECONDARY GAME," Ser. No. 10/371,958, "CENTRAL DETERMINATION GAMING SYSTEM WHICH PROVIDES A PLAYER A CHOICE IN OUTCOMES," Ser. No. 10/442,318, "CENTRAL DETERMINATION GAMING SYSTEM WITH A GAME OUTCOME GENERATED BY A GAMING TERMINAL AND APPROVED BY A CENTRAL CONTROLLER," Ser. No. 10/383,423, "CENTRAL DETERMINATION GAMING SYSTEM WITH A GAMING TERMINAL ASSISTING THE CENTRAL CONTROLLER IN THE GENERATION OF A GAME OUTCOME," Ser. No. 10/431,755, "CENTRAL DETERMINATION GAMING SYSTEM WITH A KENO GAME" Ser. No. 10/601,482, "METHOD FOR DISPLAYING AN INTERACTIVE GAME HAVING A PREDETERMINED OUTCOME," Ser. No. 10/829,578, and "METHOD FOR DISPLAYING AN INTERACTIVE GAME HAVING A PREDETERMINED OUTCOME," Ser. No. 10/846,448.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to an interactive poker game and more particularly to an interactive poker game with predetermined outcomes.

The majority of the contemporary wagering gaming devices or gaming terminals, such as slot machines or poker games, randomly generate awards and other outcomes. Such gaming terminals typically include a relatively low probability associated with obtaining the highest award, relatively medium probabilities associated with obtaining medium range awards and relatively higher probabilities associated with obtaining low range awards. These gaming terminals also include probabilities associated with obtaining losses or no award at all. The probabilities of obtaining the awards and the amount of the awards determine the average expected pay out percentage of these wagering gaming terminals. Because the outcomes of these gaming terminals are completely randomly determined, there is no certainty that a player will ever obtain any particular award. That is, no matter how many times a player plays the game, since the gaming terminal generates outcomes randomly or completely based upon a probability calculation, there is no certainty that the game will ever provide the player with a rare outcome, such as a jackpot award, or any other specific value for that matter. On the other hand, due to the random determination, the gaming terminal can provide the rare outcomes, such as jackpot awards, numerous times in a small number of plays. For example, a probability-based $1 poker machine gaming terminal may be programmed to payback 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based poker machine gaming terminal, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming terminals in-part for these reasons. These regulatory bodies permit the use of wagering gaming terminals which are guaranteed to provide certain or definite awards, so that, for example, a certain number of wins is guaranteed and the overall amount paid back to players is guaranteed. That is, the payback percentage is fixed and not an average expected amount. One type of gaming terminal which complies with this requirement is an instant-type lottery gaming terminal. An instant-type lottery gaming terminal includes a finite pool or set of electronic tickets with each electronic ticket assigned to a predetermined outcome. Alternatively, each electronic ticket could be assigned to a random number or game play seed which is deterministic of a predetermined outcome. In this embodiment, the gaming terminal utilizes the random number or game play seed in a random number generating algorithm to generate random numbers that the gaming terminal then uses to determine and provide the predetermined outcome. In an instant-type lottery gaming terminal, as the predetermined outcome for each electronic ticket is revealed to a player on the gaming terminal, the ticket is removed (i.e., flagged as used) from the finite pool or set of electronic tickets. Once removed from the pool or set, a ticket cannot be used again to determine another game outcome. This type of gaming terminal provides players with all of the available outcomes over the course of the play cycle and guarantees the actual wins and losses.

Since an instant-type lottery gaming machine has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

It should be appreciated that even though a pool may contain more than one of the same game outcome (i.e., the loss or the win and if a win, the value), the presentation to the player (such as the cards dealt or drawn in the case of simulated card games) is preferably varied for each sequential game outcome. For example, in the twenty ticket pool described above, while three game outcomes may each determine a win game outcome with a value of $1, in a poker game machine each game outcome will be preferably presented to the player as one of a plurality of different card combinations that all yield the same $1 win outcome.

Central determination gaming systems are also generally known. A central determination gaming system provides a plurality of individual gaming terminals, located in a gaming establishment, such as a casino, coupled by one or more communication links, to a central processor or controller. When a player plays a game on one of the gaming terminals, a game outcome is randomly generated based on probability data by the central controller. The generated game outcome and how the game outcome is to be presented or displayed to the player are communicated from the central controller to the individual gaming terminal and then provided to the player. It should be appreciated that one central processor may continuously run hundreds or thousands of individual gaming terminals at once. Additionally, each individual gaming terminal may include a plurality of different types of games played at a plurality of different denominations.

In order to comply with the above mentioned regulatory rules that do not permit the use of probability-based gaming terminals, central determination gaming systems have been implemented wherein the central system maintains one or more predetermined pools or sets of game outcomes. Each game outcome in each set or pool includes a game outcome component (i.e., a win, a loss, a secondary game trigger or other suitable outcome) with an associated value or payout amount, if any, and a game presentation component (i.e., how the game outcome is displayed or presented to the player). In these systems, when a player makes a wager on one of the gaming devices, the central system independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming terminal. The individual gaming terminal displays or presents the game presentation component and provides the player the game outcome component with the associated value, if any, for the selected game outcome. Additionally, certain central determination gaming systems have also been implemented wherein the central system maintains one or more predetermined pools or sets of random number or game outcome seeds.

There are a number of advantages to providing for centralized production of game outcomes at individual gaming terminals. Central production or control can assist a casino or other entity in maintaining appropriate records, controlling gaming, reducing and preventing cheating or electronic or other errors, reducing or eliminating win-loss volatility and the like. However, it should be appreciated that existing central determination gaming systems involve minimal to no player interaction other than initiating a game play at a gaming terminal. That is, similar to an instant type lottery game, the central controller selects a game outcome from the pool and the selected game outcome is provided to the player with the player unable to influence the provided game outcome. Therefore, the need exists for a central determination gaming system that provides an increased level of player interaction while still providing a predetermined game outcome to a player.

As described above, in addition to central determination gaming systems, other known gaming devices are operable to provide a player a predetermined outcome. In these gaming devices, rather than receiving an outcome from a central controller, the gaming device stores a plurality of predetermined outcomes in a memory device. Upon a player initiating a game at the gaming device, the predetermined outcome which will ultimately be provided to the player is selected and flagged or marked as used. The gaming device then proceeds with one or more game sequences and upon the conclusion of the game sequences, the selected predetermined outcome is provided to the player.

Poker games such as draw poker games are also well known. In a draw poker game, a gaming device initially deals five cards all face up from a conventional virtual deck of fifty-two playing cards. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a second five-card hand. The second five-card hand is compared to a payout table which utilizes conventional poker hand rankings to determine the winning hands. The player is provided with an award based on a winning hand and the credits the player wagered.

In another embodiment, the poker game may include multiple hands of poker played simultaneously. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand compared to a payout table and awards are provided to the player.

Some known gaming devices have attempted to provide a poker game wherein the outcome is predetermined. In these known games, a player is shown a first hand of cards and invited to select one or more cards to be discarded. Then the player is shown a second hand and a payoff is provided if the second hand is a winning hand according to a predetermined payout schedule. In these games, the initial hand and the second hand are both predetermined prior to the time the game is started. For this reason, there can often be an inconsistency between the player's selection of cards that are to be discarded and the transition from the initial hand to the second hand. This inconsistency can interfere with the desired simulation of a card game which provides a predetermined outcome.

One known gaming device, as described in U.S. Pat. No. 6,729,961 which is assigned on its face to IGT and which issued on May 4, 2004, discloses a poker game wherein an initial hand of cards is displayed to a player. The player designates which of the initial hand of cards are to be held and which are to be discarded and the game displays an intermediate hand generated in accordance with the player-specified designations. In this gaming device, a second hand which is associated with a value equal to the value associated with the predetermined game outcome is shown and in those cases where the player-specified designation (Hold/Discard) is inconsistent with a transition from the intermediate hand to the second hand, an entertaining display is shown and the predetermined game outcome is provided to the player.

Additionally, if there is an inconsistency between the award provided for the player's second hand which is based on the player's selections of cards to be discarded and the award associated with the predetermined outcome, other known gaming devices employ a mystery win card to increase or bump the provided win amount up to the win amount associated with the predetermined game outcome. In other known gaming devices, any inconsistency between the award provided for the player's second hand which is based on the player's selections of cards to be discarded and the award associated with the predetermined outcome is held in an escrow or progressive pool to be subsequently provided to a player. Accordingly, a need exists for an interactive poker game wherein the player may play a traditional true poker game and the outcome provided to the player is predetermined regardless of which cards the player holds and/or discards.

SUMMARY OF THE INVENTION

The present invention relates to an interactive game wherein a player is provided a predetermined outcome. In one embodiment, the interactive game is a poker game wherein rather than comparing a player's poker hand to a static paytable as in a traditional poker game, the outcome provided to the player is controlled by comparing the player's poker hand to the dynamically generated poker hands of one or more competing poker hands held by one or more gaming device generated players, dealers or competitors. By comparing the player's poker hand to one or more gaming device controlled competing poker hands and providing the player an outcome based on this comparison, the gaming device of the present invention is adapted to control the outcome provided to the player and thus insure that a predetermined game outcome is provided to the player based on the cards displayed to the player.

In one embodiment, prior to or upon a player initiating a game play at the gaming device such as by making a wager, a predetermined game outcome is selected. In one embodiment, each predetermined game outcome includes an outcome component, such as a win, a loss, a secondary game triggering or other suitable outcome, with an associated value or pay amount, if any. For example, a predetermined game outcome of win $50 is selected. It should be appreciated that the selected predetermined game outcome represents the outcome which will ultimately be provided to the player. In another embodiment, each game outcome also includes a presentation component. A presentation component is how the game outcome is presented or displayed to the player, such as which specific playing cards will form the initial hands of cards dealt to the player and one or more of the generated competitors in the card game.

In one embodiment, the predetermined game outcome is stored in a memory device of the gaming device. In another embodiment, the predetermined game outcome is stored in a central controller. In this embodiment, the central controller selects a predetermined game outcome from a pool or set of predetermined game outcomes and communicates the selected predetermined game outcome to the gaming device.

After selecting or receiving the predetermined game outcome, the gaming device provides or deals a player a plurality of playing cards to form a first or initial poker hand. In one embodiment, one or more of the player's dealt playing cards are based on the selected predetermined game outcome. In another embodiment, the player's dealt playing cards are randomly determined.

In addition to providing a first or initial poker hand to the player, the gaming device also provides or deals a plurality of playing cards to one or more gaming device generated or virtual players, dealers or competitors to form one or more first or initial competing poker hands. In one embodiment, one or more of the playing cards in each of the competing poker hands are based on the selected predetermined game outcome. For example, the gaming device will provide the player an initial poker hand as well as provide each of three gaming device generated competitors an initial competing poker hand. It should be appreciated that in one embodiment, dealing the player and each competitor at least one card which is based on the selected predetermined game outcome means that, as described in more detail below, the player's initial poker hand and the initial competing poker hands include at least one card that may be necessary for the comparison of second poker hands which will ultimately provide the selected predetermined game outcome to the player.

After each of the initial poker hands have been dealt (i.e., the player's initial poker hand and each of the competing initial poker hands), the gaming device generated competitors are displayed placing one or more bets or credits into a community pot. The gaming device determines the amount of bets or credits placed into the community pot based on the selected predetermined game outcome. If the selected predetermined game outcome is a win outcome with an associated value, then the gaming device determines that the generated competitors will place bets into the community pot equaling the value associated with the predetermined win outcome. For example, if the selected predetermined game outcome is a win $50 outcome, then the generated competitors will place one or more bets totaling $50 into the community pot.

If the selected predetermined game outcome is a loss outcome with no associated value (or an associated value of $0), then as described in more detail below, one of the competing poker hands will beat the player's poker hand and the player will lose the interactive poker game. In this case, since the predetermined outcome is a loss outcome and the player will not obtain any of the community pot, any amount of bets may be placed by the generated competitors into the community pot. For example, if the selected predetermined outcome is a loss outcome, then the generated competitors may place one or more bets totaling a large sum of credits into the community pot. It should be appreciated that in this example, as the gaming device has determined that the predetermined outcome is a loss outcome, the gaming device may occasionally display the generated competitors placing one or more bets to build the community pot to a substantial amount to give the player the feeling of being close to winning such a substantial amount.

In one embodiment, after the generated competitors place one or more bets into the community pot, the player and each of the gaming device generated competitors are enabled to hold or discard one or more of their initially dealt playing cards. For each discarded playing card, the gaming device provides or deals the player a new playing card to replace the discarded playing card. In one embodiment, each new playing card is at least partially based on the predetermined game outcome. The combination of the held playing cards and the new playing cards form a second poker hand. In this embodiment, once the player has been dealt a second poker hand, the gaming device determines based on the player's second poker hand and the predetermined game outcome what competing second poker hands to provide each of the gaming device generated competitors. For example, if the player's second poker hand is a pair of queens and the predetermined outcome is a win outcome, then the gaming device will determine that none of the competing second poker hands can beat or trump a pair of queens. In this embodiment, the gaming device provides each of the generated competitors a second poker hand (i.e. by replacing each discarded playing card with a new playing card) wherein none of the generated competitors second poker hands beat the player's pair of queens. In one embodiment, the second poker hands provided after the first draw are the final poker hands for the poker game. In another embodiment, at least one additional draw will occur and the second poker hands are not final poker hands but rather are intermediate poker hands. For example, if the poker game of the present invention includes a second draw, then the provided third poker hands would be considered the final poker hands. It should be appreciated that the discarding and replacing of playing cards from the player's initial poker hand and the competing initial poker hands is displayed simultaneous to the player and thus the interactive poker game appears to the player to be played as a traditional poker game.

The player's second poker hand is then compared to the competing hands of each of the gaming device generated competitors. If the predetermined game outcome is a win outcome, then the player's second poker hand will beat each of the competing hands and the player is provided the community pot. As the gaming device generated competitors have previously placed bets into the community pot equaling the value associated with the predetermined outcome, the player is provided the selected predetermined game outcome and the interactive poker game ends. If the predetermined game outcome is a loss outcome, then the gaming device has provided one or more of the gaming device generated competitors with a competing second poker hand that beats or trumps the player's second poker hand. In this case, one or more of the gaming device generated competitors is displayed as winning the poker game and obtaining the community pot.

In one embodiment, a push or tie between the player's second poker hand and at least one of the competing second poker hands is considered a loss or loss outcome. In this embodiment, if the predetermined game outcome is a loss outcome, then the gaming device will provide at least one of the gaming device generated competitors with a second poker hand that either trumps the player's second poker or ties the player's second poker hand. In another embodiment, a push or tie between the player's second poker hand and at least one of the competing second poker hands is considered a win outcome. In this embodiment, if the predetermined game outcome is a win outcome and at least one of the competing second poker hand ties or pushes with the player's second poker, the player is provided at least a portion of the community pot. For example, if the predetermined game outcome is a win $10 outcome and the community pot is $20, then the gaming device may provide one of the gaming device generated competitors with a competing second poker hand which ties or equals the player's second poker hand. In this example, the gaming device provides the player with a $10 portion of the community pot which equals the predetermined game outcome.

In one embodiment, if the predetermined game outcome is a win outcome, then the player's first or initial poker hand must beat or trump each of the competing second poker hands of each of the gaming device generated competitors. In this embodiment, if the player decides not to discard any of the playing cards in their first or initial poker hand, then the player's first poker hand is converted into the player's second poker hand. In this case, since the predetermined game outcome is a win outcome and the player's second poker hand must beat or trump each of the competing second poker hands of each of the gaming device generated competitors, the gaming device must insure that the player's first poker hand (which is subsequently converted into the player's second poker hand) will still beat or trump each of the competing second poker hands of each of the gaming device generated competitors.

In one embodiment of the present invention, unlike a traditional poker game wherein the player's outcome is determined by comparing the player's second poker hand to a static paytable, by comparing the player's second poker hand to the competing second poker hands of one or more dynamic gaming device generated competitors (wherein the competing second poker hand of one or more of the gaming device generated competitors is determined based on the player's decisions in the interactive poker game and the predetermined outcome), in one embodiment, the gaming device is adapted to enable a player to play a realistic interactive poker game that provides the player a predetermined game outcome. It should be appreciated that this embodiment of the present invention is not eliminating the paytable, but rather is altering the function of the paytable from a static form (i.e., comparing the player poker hands against different predetermined poker hands) to a dynamic form (i.e., comparing the player poker hands against gaming device generated dynamic competitors poker hands). In another embodiment, the gaming device is operable to compare the player's second poker hand against one of a plurality of different static paytables. In this embodiment, the gaming device utilizes one or more supplemental payouts or modifiers to insure that the total payout provided to the player is equal to the payout associated with the selected predetermined game outcome.

In addition to providing a five card draw poker game which provides one or more predetermined game outcomes to a player, the present invention may be employed with other suitable types of poker games, such as Texas Hold'em, as well as other suitable multi-player non-poker interactive games, such as blackjack. Any suitable card game which includes a comparison between a player's cards and the competing cards of one or more competitors may be implemented with the present invention.

The present invention provides a number of advantages over existing predetermined outcome poker games. For example, since the gaming terminals of the present invention enable the player to make one or more choices or decisions during the poker game, the present invention includes an aspect of player interaction and player involvement while still providing the player a predetermined outcome. Additionally, the use of gaming device generated competitors to influence if the player wins or loses the poker game and to determine the community pot amount complies with certain regulations that guarantees a specific amount of actual wins and losses, while also providing the player a level of excitement during the play of the game.

Additional features and advantages of the present invention are described in, and will be apparent from, the following Detailed Description of the Invention and the figures.

DETAILED DESCRIPTION OF THE INVENTION

Figure 1A:
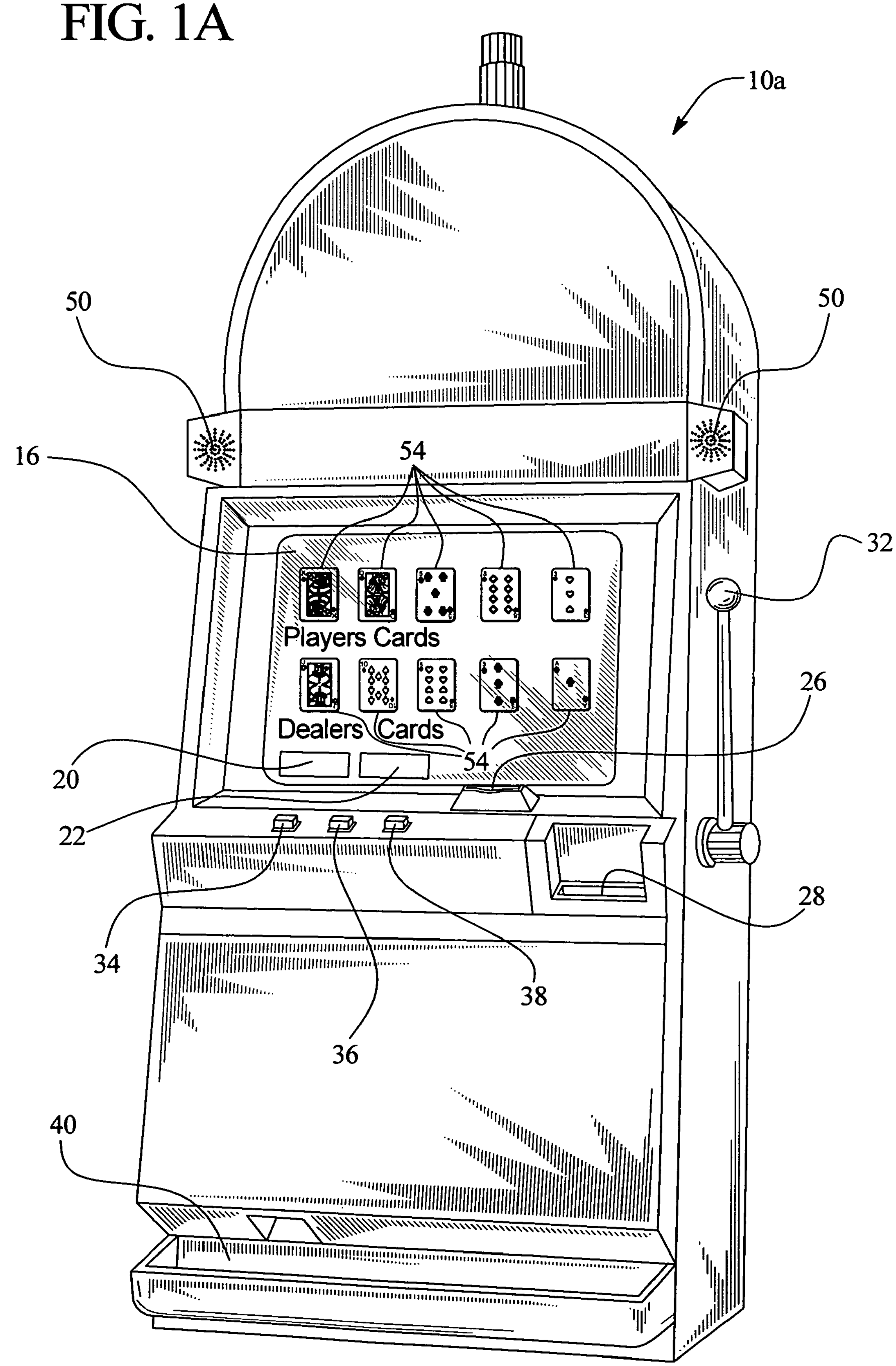
FIGS. 1A and 1B are perspective views of alternative embodiments of the gaming device of the present invention.
Figure 1B:
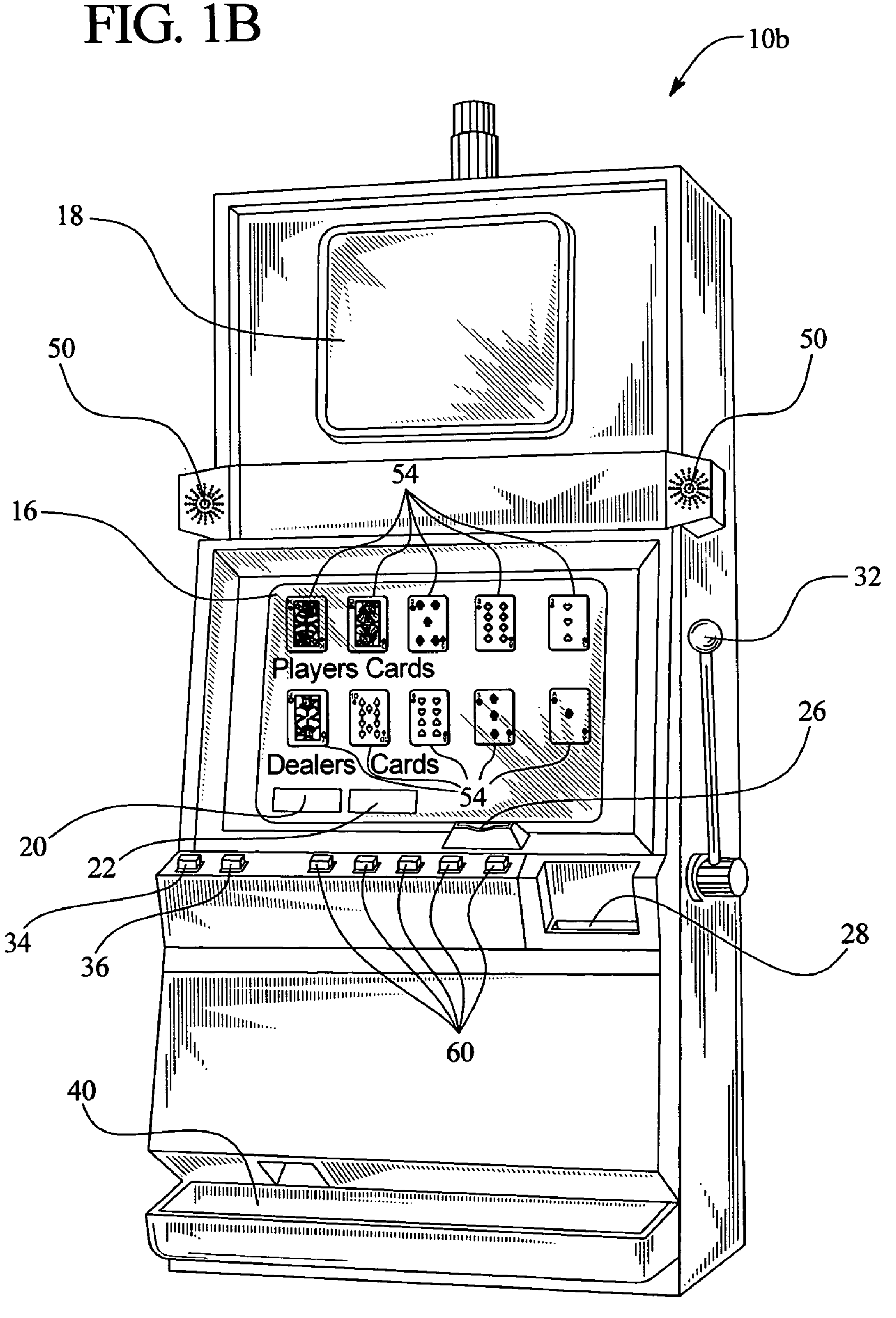

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
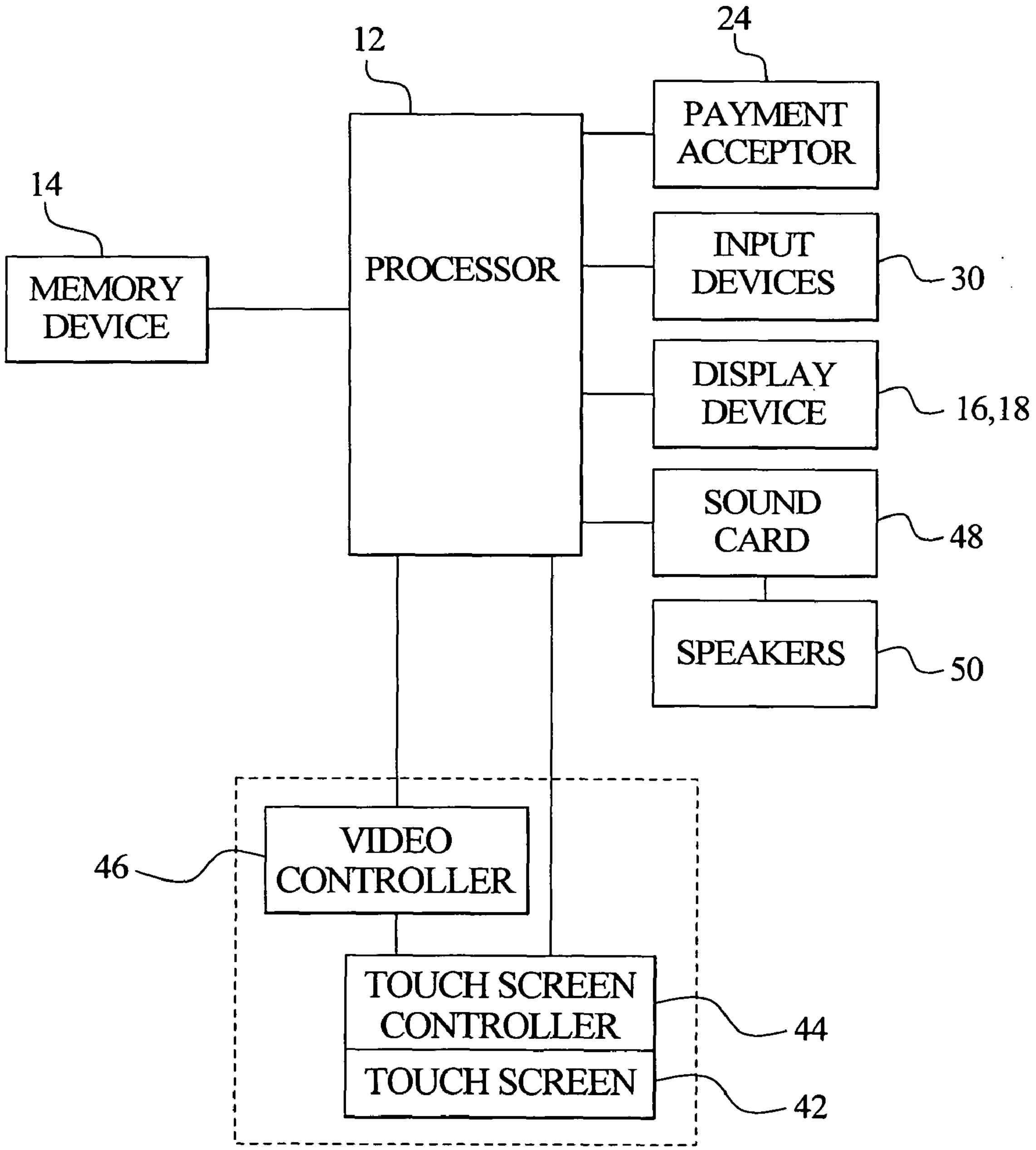
FIG. 2A is a schematic block diagram of an electronic configuration of one embodiment of the gaming terminal of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device stores a pool of predetermined outcomes which will be provided to the players during the play of the interactive poker game of the present invention.

In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer."

In one embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players, with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of playing cards 54, game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, shown in FIG. 1B, the gaming device also includes a plurality of hold/discard buttons 60. The player may designate each of the plurality of playing cards dealt to the player as either a hold or discard by using the hold/discard buttons. In one embodiment, the gaming device includes one hold/discard button for all of the playing cards. In another embodiment, the gaming device includes an individual hold/discard button for each of the dealt playing cards.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
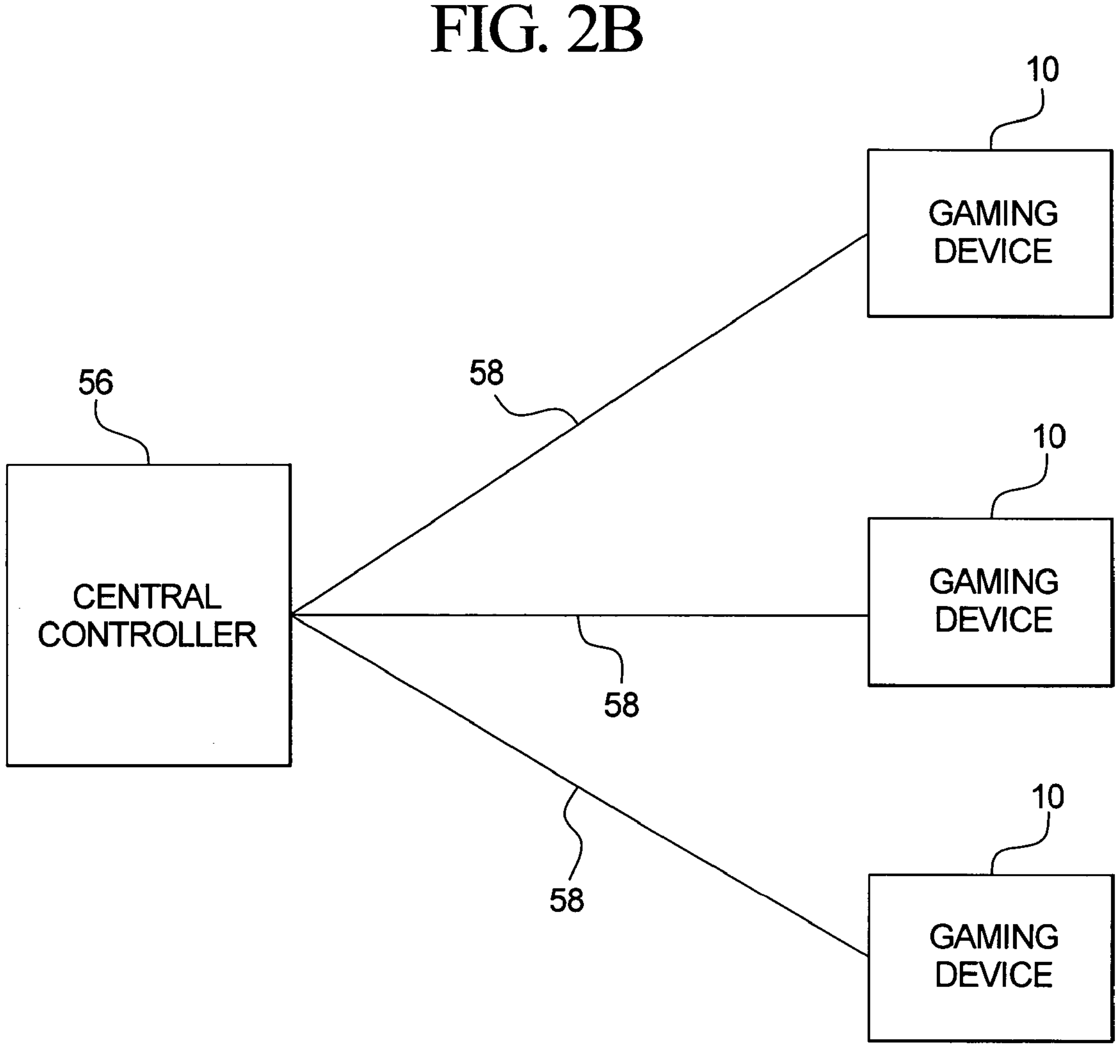
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the predetermined game outcome provided to the player is selected by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller. Upon receiving the game outcome request, the central controller independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming device to be utilized in the interactive poker game.

In one embodiment, the central controller maintains at least one predetermined set or pool of predetermined game outcomes for each type of game provided on the gaming terminals. In an alternative embodiment, the central controller maintains a plurality of predetermined sets or pools of predetermined game outcomes for each type of provided game. In another embodiment, the central controller maintains a predetermined set or pool of predetermined game outcomes for each denomination of each type of game provided on the gaming terminals. In another embodiment, the central controller maintains at least one predetermined set or pool of predetermined game outcome seeds. Each game outcome seed is deterministic of a predetermined game outcome. Other methods for storing the pool or set of predetermined game outcomes may be employed in accordance with the present invention.

Each predetermined game outcome includes an outcome component, such as a win, a loss, a secondary game triggering or other suitable outcome, with an associated value or pay amount, if any. For example, one game outcome may be a win $5 game outcome and another game outcome may be a loss or $0 game outcome. Each set or pool of predetermined game outcomes may include a plurality of each type of predetermined game outcome. For example, a pool of one thousand game outcomes may include hundreds of a lower range award (i.e., a win $1 game outcome) and one or few of the highest award (i.e., a win $1000 game outcome). In one embodiment, a plurality of the game outcomes in the predetermined set or pool are different. In another embodiment, all of the game outcomes in the set or pool are different.

In one embodiment, each game outcome may also include a presentation component. A presentation component is how the predetermined game outcome is presented or displayed to the player, such as a specific hand of cards dealt. In order to increase player entertainment, a plurality of game outcomes with the same outcome component and associated value have different presentation components. That is, the same win $5 game outcome is presented or displayed to the player in a different way. For example, in a poker style game, each of the same game outcomes are displayed or presented to the player as a different hand of cards.

In one embodiment, all of the gaming terminals which are coupled to the central processor are configured to play the same type of game. In an alternative embodiment, a plurality of the gaming terminals are configured so that different gaming terminals may be used to play different types of games. That is, some gaming terminals may be used for playing a slot machine style game, others may be used for playing a poker style game, others may be used for playing a blackjack style game, and the like. In another embodiment, a plurality of gaming terminals may each be configured for playing a plurality of different games.

In another embodiment, one or more of the gaming devices of the present invention are in communication with a central server or controller for monitoring purposes only. In this embodiment, each gaming device stores a pool of predetermined outcomes to be provided to the player in a memory and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, one or more of the gaming devices of the present invention are connected together through a data network. In another embodiment, one or more of the gaming devices of the present invention are connected to the central controller through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server and operable to provide one or more progressive awards to one or more players. A progressive award is an award amount which includes an initial amount funded by a casino and an additional amount funded through a portion of each wager made on the progressive gaming device. For example, 1% of each wager on the primary game of the gaming device may be allocated to the progressive award or progressive award fund. The progressive award grows in value as more players play the gaming device and more portions of the players' wagers are allocated to the progressive award. When a player obtains a winning outcome which results in or is associated with the progressive award, the accumulated progressive award is provided to the player. After the progressive award is provided to the player, the amount of the next progressive award is reset to the initial value and a portion of each subsequent wager is allocated to the next progressive award as described above. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

In one embodiment, the interactive game of the present invention may be employed as either a primary game or a base game. If the interactive game is implemented as a secondary game, then the gaming device can incorporate any suitable wagering primary or base game. The gaming machine or device of the present invention may include some or all of the features of conventional gaming machines or devices. The primary or base interactive game may comprise any suitable reel-type game, card game, number game or other game of chance susceptible to representation in an electronic or electromechanical form which produces a predetermined outcome upon activation from a wager. That is, different primary wagering games, such as video poker games, video blackjack games, video Keno, video bingo or any other suitable primary or base game may be implemented into the present invention.

In another embodiment, if the interactive game is implemented as a primary game, then in addition to winning credits in the primary interactive game, the gaming device may also give players the opportunity to win credits in a bonus or secondary game or bonus or secondary round. The bonus or secondary game enables the player to obtain a prize or payout in addition to the prize or payout, if any, obtained from the base or primary game.

In one embodiment, the bonus or secondary game may be any type of suitable game, either similar to or completely different from the base or primary game. In one embodiment, the bonus game is one or more hands of an interactive poker game. In another embodiment, the bonus game is a plurality of simultaneously played hands of an interactive poker game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

It should be appreciated that if the gaming device enables the player to play a secondary game in addition to the interactive game, then regardless of how the game outcome is ultimately provided to the player, either as a value or payout from the primary or base game, as a value or payout from the secondary or bonus game, as a loss from the primary or base game or as a loss from the secondary or bonus game, the game outcome is predetermined. That is, if the predetermined game outcome is a win outcome and the value or payout provided in the primary or base game do not reach the value or payout associated with the predetermined game outcome, then the gaming device utilizes the secondary or bonus game to supplement any value or payout provided in the base game to sum the total value or payout from the primary and secondary game to the value or payout associated with the predetermined game outcome. For example, if the particular game outcome associated with the player's choice or decision is a win outcome with an associated value or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game outcome is removed from the set of game outcomes.

Figure 3:
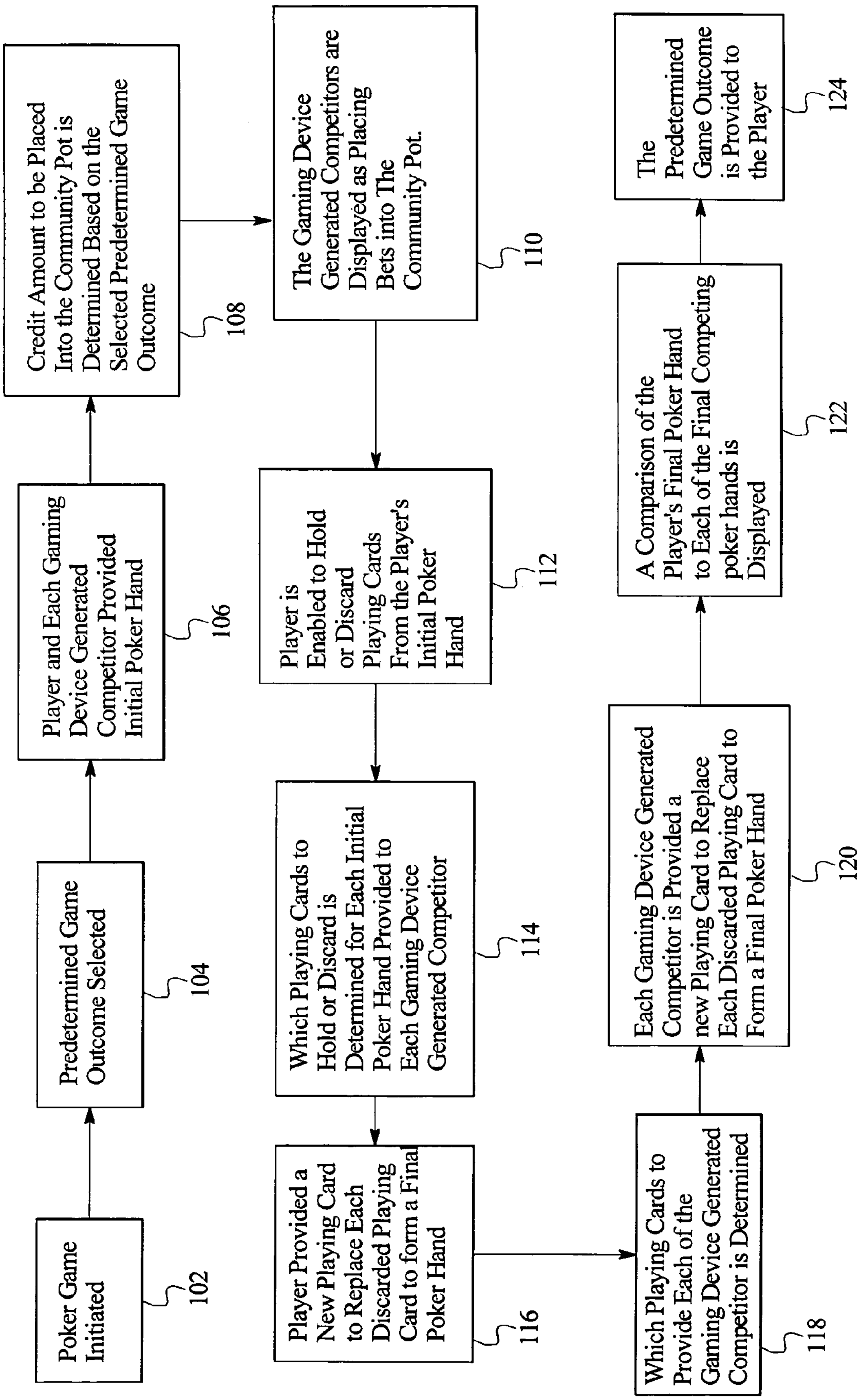
FIG. 3 is a schematic block diagram illustrating one embodiment of the present invention wherein a predetermined game outcome is selected and the player plays an interactive poker game wherein the selected predetermined game outcome is provided to the player.

Referring to FIG. 3, the game play of an interactive game of the present invention, such as an interactive poker game is initiated by a player inserting the appropriate amount of money or tokens at the gaming device as indicated in block 102. After the interactive poker game is initiated, a predetermined outcome is selected as indicated in block 104.

In one embodiment, the gaming device selects one of the predetermined outcomes stored in a memory device of the gaming device. In another embodiment, as described above, the gaming device is in communication with the central controller and the central controller selects a predetermined game outcome. The central controller then flags the selected game outcome as used (i.e., preventing the selected game outcome from being subsequently selected by the central controller) and communicates the predetermined game outcome to the gaming device.

In another embodiment, a predetermined game outcome is determined for each of a plurality of linked or networked gaming devices based on the results of a multi-gaming device Bingo game. In this embodiment, each individual gaming device utilizes the game outcome provided to that gaming device in a Bingo game as the predetermined game outcome for a displayed poker game at that gaming device. In one embodiment, the game outcomes determined in the Bingo game are utilized in the poker game and the Bingo game is displayed to the player.

In these embodiments, as each gaming device is enrolled in the Bingo game, such as upon an appropriate wager or engaging an input device, the enrolled gaming device is provided a different Bingo card. Each Bingo card consists of a matrix or array of elements, wherein each element is designated with a separate indicia, such as a number. It should be appreciated that each different Bingo card includes a different combination of elements. For example, if four Bingo cards are provided to four enrolled gaming devices, the same element may be present on all four of the Bingo cards while another element may solely be present on one of the Bingo cards.

In operation of this embodiment, upon providing a different Bingo card to each of a plurality of enrolled gaming devices, the central controller randomly selects or draws, one at a time, a plurality of the elements. As each element is selected, each gaming device determines if the selected element is present on the Bingo card provided to that enrolled gaming device. If the selected element is present on the Bingo card provided to that enrolled gaming device, that gaming device marks or flags the selected element on the provided Bingo card. This process of selecting elements and marking any selected elements on the provided Bingo cards continues until one or more predetermined patterns are marked on one or more of the provided Bingo cards. It should be appreciated that in one embodiment, the gaming device requires the player to engage a "daub" button (not shown), in order to initiate the process of the gaming device marking or flagging any selected elements.

After one or more predetermined patterns are marked on one or more of the provided Bingo cards, a game outcome is determined for each of the enrolled gaming devices based, at least in part, on the selected elements on the provided Bingo cards. As described above, the game outcome each gaming device determines for the Bingo game is utilized by that gaming device as the predetermined game outcome provided to the player in the displayed poker game. For example, a first gaming device to mark selected elements in a predetermined pattern is provided a first outcome of win $10 which will be provided to the player in the poker game regardless of how the player plays the provided initial poker hand and a second gaming device to mark selected elements in a different predetermined pattern is provided a second outcome of win $2 which will be provided to the player in the poker game regardless of how the player plays the provided initial poker hand. It should be appreciated that as the process of marking selected elements continues until one or more predetermined patterns are marked, this embodiment insures that at least one Bingo card will win the Bingo game and thus at least one enrolled gaming device will provide a predetermined winning game outcome to a player in at least one poker game.

After selecting, receiving or determining the predetermined game outcome, the gaming device provides or deals each player and one or more gaming device generated players, dealers or competitors a plurality of playing cards as indicated in block 106. The playing cards dealt to each player and the gaming device generated competitors form a first or initial poker hand (i.e., a player's first or initial poker hand and one or more competing first or initial poker hands).

In one embodiment, at least one and preferably a plurality of the dealt playing cards are based on the predetermined game outcome. It should be appreciated that in this embodiment, basing at least one and preferably a plurality of the dealt playing cards on the selected predetermined game outcome means that the player's initial poker hand and the initial competing poker hands includes at least one card that may be necessary for the comparison of the player's second poker hand and at least one of the competing second poker hands which will ultimately provide the selected predetermined game outcome to the player. For example, if a push between the player's poker hand and at least one competing poker hand is considered a win for the player (i.e., if a push occurs, the community pot goes to the player), then if the selected predetermined game outcome is a loss outcome and the gaming device randomly determines that the player's initial poker hand will equate to a royal flush poker hand, then in order to insure that the predetermined loss outcome is still possible based on the player's second poker hand, the gaming device will provide the player at least one card which is based on the selected game outcome which will function to break up the randomly determined royal flush. In this example, the player will be provided four playing cards toward the royal flush, but not the initially determined royal flush.

In one embodiment, the number of gaming device generated competitors that are each dealt a competing hand is predetermined. In another embodiment, the number of gaming device generated competitors is randomly determined. In another embodiment, the number of gaming device generated competitors is based on the player's wager. In one embodiment, the larger the player's wager, the more competitors in the poker game. In this embodiment, the player may perceive that the larger the player's initial wager, the more gaming device generated competitors to play against and thus the greater the amount wagered by the generated competitors into the community pot. In another embodiment, the larger the player's initial wager, the less generated competitors to play against. In this embodiment, the less generated competitors may be perceived by the player to be less competing poker hands to beat in order to win the community pot. It should be appreciated that any suitable method of determining the number of generated competitors to participate in the poker game may be employed in accordance with the present invention.

In one embodiment, the playing cards are dealt from a single fifty-two card deck. In another embodiment, the playing cards are dealt from a plurality of fifty-two card decks. In another embodiment, the playing cards are selected from a predetermined number of cards. In another embodiment, the playing cards are selected from a deck of more than fifty-two playing cards, such as a deck including one or more "joker" or wild playing cards. In this embodiment, a joker or wild playing card may substitute for any other playing card.

In one embodiment, if the predetermined game outcome is a win outcome, then the player's first initial poker hand must beat or trump each of the competing second poker hands of each of the gaming device generated competitors that will not fold their hands during the course of the interactive poker game. In this embodiment, if the player decides not to discard any of the playing cards in their initial poker hand, then the player's initial poker hand is converted into the player's second poker hand. In this case, since the predetermined game outcome is a win outcome and the player's second poker hand must beat or trump each of the competing second poker hands of each of the remaining gaming device generated competitors (i.e., the gaming device generated competitors that didn't fold their initial poker hand), the gaming device must insure that the player's first poker hand (which is subsequently converted into the player's second poker hand) will still beat or trump each of the competing second poker hands of each of the gaming device generated competitors.

In one embodiment, the gaming device displays one or more of the playing cards dealt or provided to each of the gaming device generated competitors. In another embodiment, the gaming device displays one or more of the players cards dealt to a plurality of the gaming device generated competitors. In another embodiment, the gaming device only displays to the player an image of the playing cards dealt to the player without providing any playing cards to the gaming device generated competitors. It should be appreciated that in this embodiment, no playing cards are initially dealt to any of the gaming device generated competitors, but rather, the gaming device merely displays an image of a plurality of face down cards being apparently initially dealt to the player. In this embodiment, the gaming device provides or deals each of the gaming device generated competitors a competing second poker hand after determining the player's second poker hand, wherein one or more of the competing second poker hands are based on the player's second poker hand and the predetermined game outcome.

In one embodiment, after each of the initial poker hands have been dealt to the player and the gaming device generated competitors (i.e., an initial player poker hand and one or more initial competing poker hands), the gaming device determines the award or credit amount placed into the community pot based on the selected predetermined game outcome as indicated in block 108. If the selected predetermined game outcome is a win outcome with an associated value, then the gaming device determines that the generated competitors will place bets into the community pot equaling the value associated with the predetermined win outcome. If the selected predetermined game outcome is a loss outcome with no associated value (or an associated value of $0), then any award or credit award amount may be placed in the community pot. As described in more detail below, if the predetermined outcome is a loss outcome, then one of the competing poker hands will beat the player's poker hand, the player will lose the interactive poker game and the player will not obtain any of the community pot. Accordingly, any award or credit amount may be placed by the generated competitors into the community pot. For example, if the gaming device has determined that the predetermined outcome is a loss outcome, the gaming device may display the generated competitors placing one or more bets to build the community pot to a substantial amount to give the player the feeling of being close to winning such a substantial amount.

In one embodiment, after determining the award or credit amount to be placed in the community pot, the gaming device displays the gaming device generated competitors as placing one or more bets into the community pot as indicated in block 110. The total amount bet from the generated competitors will equal the determined award or credit amount. In one embodiment, the player's wager in the poker game is initially placed into the community pot as the player's ante for playing the interactive poker game.

In one embodiment, similar to a traditional multi-player poker game, the gaming device may display one or more of the generated competitors dropping out of the poker game and thus folding their initial competing poker hand. In this embodiment, the amount placed in the community pot from the remaining generated competitors (along with any amount placed in the community pot from any dropped out competitors before they dropped out) will equal the determined award or credit amount. In another embodiment, the gaming device may display a plurality of betting sequences wherein the total amount bet from all the betting sequences equal the determined award or credit amount. In this embodiment, each betting sequence may include displaying one gaming device generated competitor placing an initial bet and another gaming device generated competitor raising the initial bet.

In one embodiment, after the generated competitors place one or more bets into the community pot, the player is enabled to hold or discard one or more of their initially dealt playing cards as indicated in block 112. It should be appreciated that the player may play their initial poker hand in any suitable manner. For example, the player may play their initial poker hand utilizing a risky strategy, a conservative strategy or any strategy the player chooses. Based on the selected predetermined outcome and which playing cards the player indicated to hold or discard, the gaming device determines for each initial competing hand provided to each gaming device generated competitor which playing cards to hold or discard as indicated in block 114.

For each discarded playing card, the gaming device provides or deals the player a new playing card to replace the discarded playing card as indicated in block 116. In one embodiment, each new playing card is at least partially based on the predetermined game outcome. The combination of the held playing cards and the new playing cards form a second or final poker hand which is based on the player's decisions regarding which playing cards to hold and which playing cards to discard. In this embodiment, the second poker hands provided after the first draw are the final poker hands for the poker game. However, it should be appreciated that in another embodiment (not shown), at least one additional draw will occur and the second poker hands are not final poker hands but rather are intermediate poker hands. For example, if the poker game includes a second draw, then the provided third poker hands would be considered the final poker hands.

Once the player has been dealt a second poker hand, the gaming device determines based on the player's second poker hand, the playing cards that the gaming device determined each generated competitors should discard and the predetermined game outcome, what competing second or final poker hands to provide each of the gaming device generated competitors as indicated in block 118. For example, if predetermined outcome is a win outcome, then the gaming device will determine which playing cards to deal each of the gaming device generated competitors in order to insure that the player's second poker hand beats or trumps each of the gaming device generated competitors competing second poker hands. If the predetermined outcome is a loss outcome, the gaming device will determine which playing cards to deal each of the gaming device generated competitors in order to ensure that at least one of the gaming device competitors competing second poker hands beats or trumps the player's second poker hand.

In one embodiment, after the player indicates which playing cards to discard and the gaming device has provided the player a new playing card for each discarded playing card, the gaming device determines for each gaming device generated competitor which playing cards to hold, which playing cards to discard and which playing cards to replace the discarded playing cards. It should be appreciated that the determinations the gaming device determines for each gaming device generated competitor is based on the predetermined outcome which will ultimately be provided to the player.

In one embodiment, after determining which playing cards to provide each of the generated competitors, the gaming device provides each of the generated competitors a competing second poker hand (i.e. by replacing each discarded playing card with a new playing card) as indicated in block 120.

In one embodiment, the number of playing cards in each initial poker hand and each second or final poker hand is the same. In another embodiment, the number of playing cards in each of the initial poker hands and in each of the second poker hands are different. In one embodiment, the second or final poker hands have less cards than the initial poker hands. In another embodiment, the second or final poker hands have more cards than the initial poker hands. For example, each initial poker hand may include four playing cards and each of the second poker hands may include five playing cards. In this embodiment, the player is enabled to hold or discard zero to four of the initially dealt playing cards and the gaming device replaces/draws the number of cards that the player requested plus one additional card. This additional card provides that the player's second poker hand is a traditional five-card poker hand. It should be appreciated that as long as the player and each of the generated competitors second or final poker hands have the same number of cards (i.e., to provide for a proper comparison as described in more detail below), the initial poker hands of the player and each of the generated competitors may have a different number of playing cards.

The gaming device displays a comparison of the player's second poker hand to each of the competing second poker hands as indicated in block 122. The gaming device then provides the predetermined game outcome to the player as indicated in block 124 and the interactive poker game ends. If the predetermined outcome is a win outcome associated with a value, then the gaming device generated competitors have previously placed bets into the community pot equaling the value associated with the predetermined win outcome and the player is provided the selected predetermined game outcome. If the predetermined outcome is a loss outcome with an associated value of $0, then the competing second poker hand of at least one of the gaming device generated competitors will beat the player's second poker hand and any value or credit amount placed into the community pot will be displayed as being provided to one of the gaming device generated competitors and not the player.

In one embodiment, a push or tie between the player's second poker hand and at least one of the competing second poker hands is considered a loss or a loss outcome. In this embodiment, if the predetermined game outcome is a loss outcome, then the gaming device will provide at least one of the gaming device generated competitors with a second poker hand that either trumps the player's second poker or ties the player's second poker hand. It should be appreciated that in this embodiment, similar to a traditional poker game, the gaming device may randomly determine each of the playing cards to provide or deal to the player and regardless of the randomly determined playing cards, still provide the player the selected predetermined game outcome. That is, regardless of the poker hand randomly dealt to the player, the gaming device can deal at least one of the gaming device generated competitors a second poker hand that at least ties the player's second poker hand, causing the player's second poker hand to push with the competing second poker hand and thus providing the player a predetermined loss outcome. For example, if the predetermined game outcome is a loss outcome and the player is randomly initially dealt a hearts royal flush, the gaming device will provide at least one of the gaming device generated competitors a spade royal flush second competing poker hand. In this example, since the player's second hearts royal flush poker hand pushes with the competing spade royal flush second poker hand and a push is considered a loss, the player loses the poker game and the predetermined loss outcome is provided to the player.

In another embodiment, a push or tie between the player's second poker hand and at least one of the competing second poker hands is considered a win outcome. In this embodiment, if the predetermined game outcome is a win outcome and at least one of the competing second poker hand ties or pushes with the player's second poker, the player is provided at least a portion of the community pot. For example, if the predetermined game outcome is a win $10 outcome and the community pot is $20, then the gaming device may provide one of the gaming device generator competitors with a competing second poker hand which ties or equals the player's second poker hand. In this example, the gaming device provides the player with a $10 portion of the community pot which equals the predetermined game outcome.

In one embodiment wherein the gaming device only displays the playing cards dealt to the player and displays an image of playing cards being apparently dealt to the gaming device generated competitors, the gaming device utilizes a look-up table of possible poker hands to determine which second poker hand to provide to each of the gaming device generated competitors. In this embodiment, if the predetermined game outcome is a win outcome, the gaming device determines, with reference to an appropriate look-up table and the second poker hand provided to the player, which poker hands are trumped by the player's second poker hand. In this example, for each gaming device generated competitor, the gaming device randomly selects one of the poker hands which were determined to be trumped or beaten by the player's second poker hand and provides these selected poker hands to the gaming device generated competitors as competing second poker hands. Accordingly, the player's second hand trumps each of the competing second poker hands and the player is provided the community pot which equals the value or payout associated with the predetermined win outcome.

On the other hand, if the predetermined game outcome is a loss outcome, the gaming device determines, with reference to an appropriate look-up table and the second poker hand provided to the player, which poker hands would trump or beat the player's second poker hand. In this example, for at least one of the gaming device generated competitors, the gaming device randomly selects one of the poker hands which was determined to trump or beat the player's second poker hand and provides this selected poker hand to at least one of the gaming device generated competitors as a competing second poker hand. Accordingly, at least one competing second poker hand beats or trumps the player's second hand, the player loses the poker hand and the predetermined loss outcome is provided to the player.

In addition to providing a five card draw poker game which provides one or more predetermined game outcomes to a player, the present invention may be employed with other suitable types of poker games, such as Texas Hold'em, as well as other suitable multi-player non-poker interactive cards games, such as blackjack. Any suitable interactive card game which includes a comparison between a player's cards and the competing cards of one or more competitors may be implemented with the present invention.

In another embodiment, the gaming device is operable to enable a player to play a plurality of interactive poker games simultaneously wherein the gaming device provides one or more predetermined game outcomes to the player. In one embodiment, a predetermined game outcome is selected for each individual poker game and while played simultaneously, the gaming device provides the player a separate predetermined game outcome for each individual poker game. In another embodiment, one or more of the simultaneously played poker games may be linked wherein the total outcome provided to the player for the sum of all the played poker games is equal to the selected predetermined game outcome.

Figure 4A:
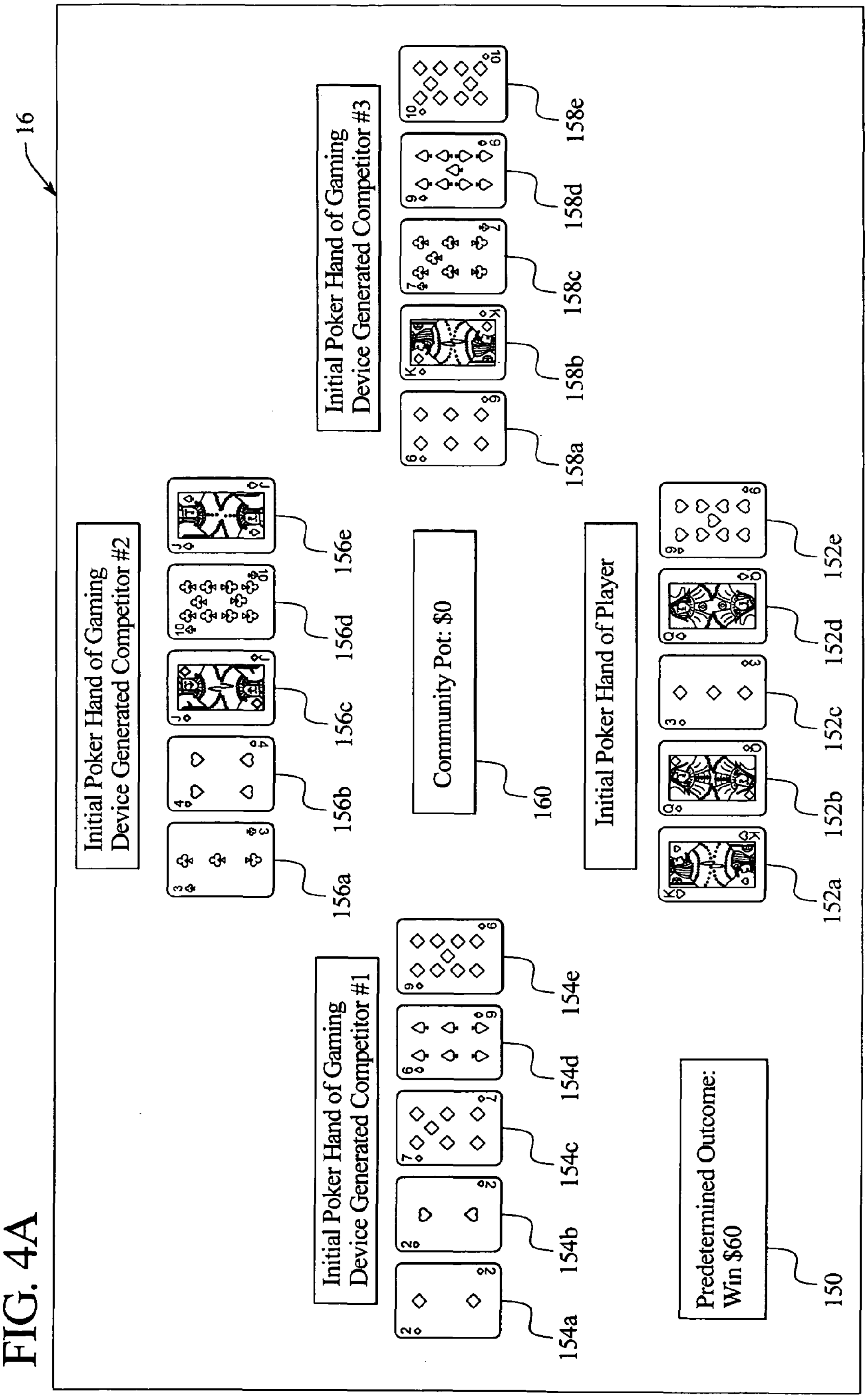
FIGS. 4A to 4E are top plan views of one embodiment of the present invention illustrating one interactive poker game sequence of the present invention.

Referring now to FIGS. 4A to 4E, in one embodiment of the present invention, the gaming device provides a screen or display 16 wherein the player will play an interactive poker game. As seen in FIG. 4A, upon the initiation of the poker game, a predetermined outcome 150 of $60 is selected. It should be appreciated that during game play the selected predetermined outcome is not displayed to the player but is only displayed here for illustration purposes. Additionally, the community pot amount 160, as described in more detail below, is initially set at $0. In alternative embodiments, the community pot amount is initially set at a predetermined amount, a randomly determined amount, an amount based on the player's wager, an amount based on play of a sub-game or any other suitable amount.

After the predetermined outcome is selected, the gaming provides a plurality or hand of playing cards to the player wherein one or more of the provided playing cards are based on the selected predetermined outcome. In this case, the gaming device provided the player five playing cards (king of hearts, queen of diamonds, three of diamonds, queen of spades and nine of hearts), 152*a*, 152*b*, 152*c*, 152*d* and 152*e*, respectively. The player's provided playing cards form a first or initial poker hand.

In addition to providing the player an initial poker hand, the gaming device provides a plurality of playing cards to each the gaming device generated competitors, in this case three competitors. One or more of the provided playing cards to each of the gaming device generated competitors are based on the selected predetermined outcome. For example, the five playing cards provided to a first gaming device generated competitor to form a first initial competing poker hand are the two of diamonds, two of hearts, seven of diamonds, six of spades and nine of diamonds, 154*a*, 154*b*, 154*c*, 154*d* and 154*e*, respectively. The five playing cards provided to a second gaming device generated competitor to form a second initial competing poker hand are the three of clubs, four of hearts, jack of diamonds, ten of clubs and the jack of spades, 156*a*, 156*b*, 156*c*, 156*d* and 156*e*, respectively. The five playing cards provided to a third gaming device generated competitor to form a third initial competing poker hand are the six of diamonds, king of diamonds, seven of clubs, nine of spades and ten of diamonds, 158*a*, 158*b*, 158*c*, 158*d* and 158*e*, respectively. It should be appreciated that as described above, the selected predetermined outcome is a win outcome and thus the player's initial hand beats or trumps each of the three competing poker hands. In this example, the poker game includes three gaming device generated competitors, but any suitable amount of gaming device generated competitors may be implemented with the present invention.

As seen in FIG. 4A, each of the playing cards provided to each of the gaming device generated competitors is displayed to the player. In another embodiment, the gaming device displays one or more of the playing cards dealt to one or more of the gaming device generated competitors. In another embodiment, the gaming device only displays to the player the playing cards dealt to the player and masks the playing cards dealt to the gaming device generated competitors.

Figure 4B:
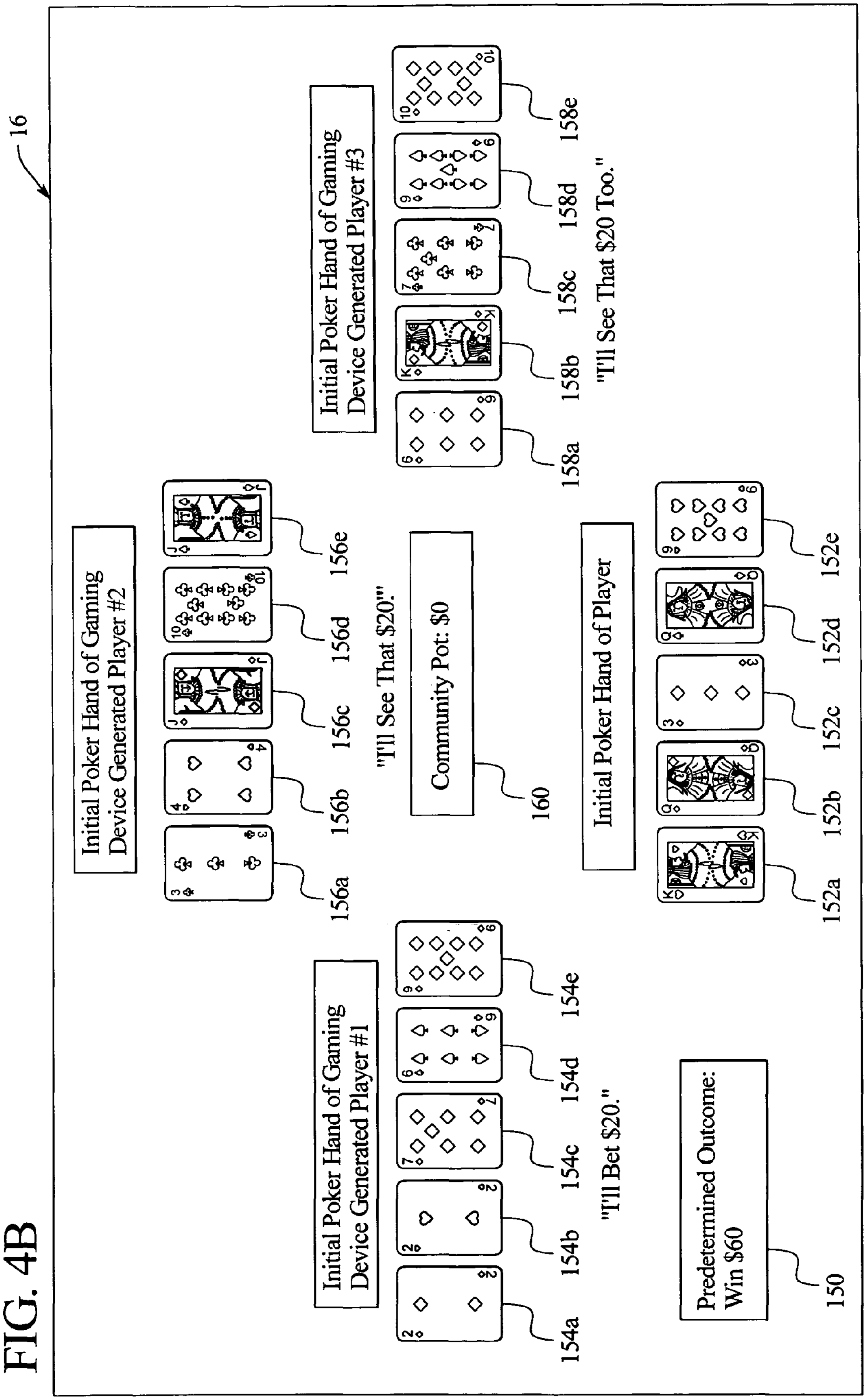

As illustrated in FIG. 4B, after each of the initial poker hands have been dealt to the player and the gaming device generated competitors, the gaming device generated competitors are displayed placing one or more bets or credits into the community pot. The gaming device determines the amount of bets or credits placed into the community pot based on the selected predetermined game outcome. In this case, as the selected predetermined game outcome is a win outcome with an associated value of $60, the gaming device determines that the total amount of bets or credits placed into the community pot will equal $60. For example, the first gaming device generated competitor is displayed as placing an initial amount of $20 into the community pot. The second and third gaming device generated competitors are then displayed each placing an additional $20 into the community pot, thus bringing the total amount in the community pot to $60. Appropriate messages such as "I'LL BET $20," "I'LL SEE THAT $20" AND "I'LL SEE THAT $20 TOO" are preferably provided to the player visually, or through suitable audio or audiovisual displays.

If the predetermined game outcome was a loss outcome with an associated value of $0, then at least one of the competing poker hands will trump the player's poker hand and any amount placed into the community pot would not be provided to the player. Thus, in this example, the generated competitors are displayed placing any amount into the community pot. In one embodiment, if the predetermined game outcome is a loss outcome, the amount placed into the community pot is predetermined for the selected game outcome. In another embodiment, the amount placed into the community amount is randomly determined. In another embodiment, the amount placed into the community pot is based on the player's wager or any other suitable event.

Figure 4C:
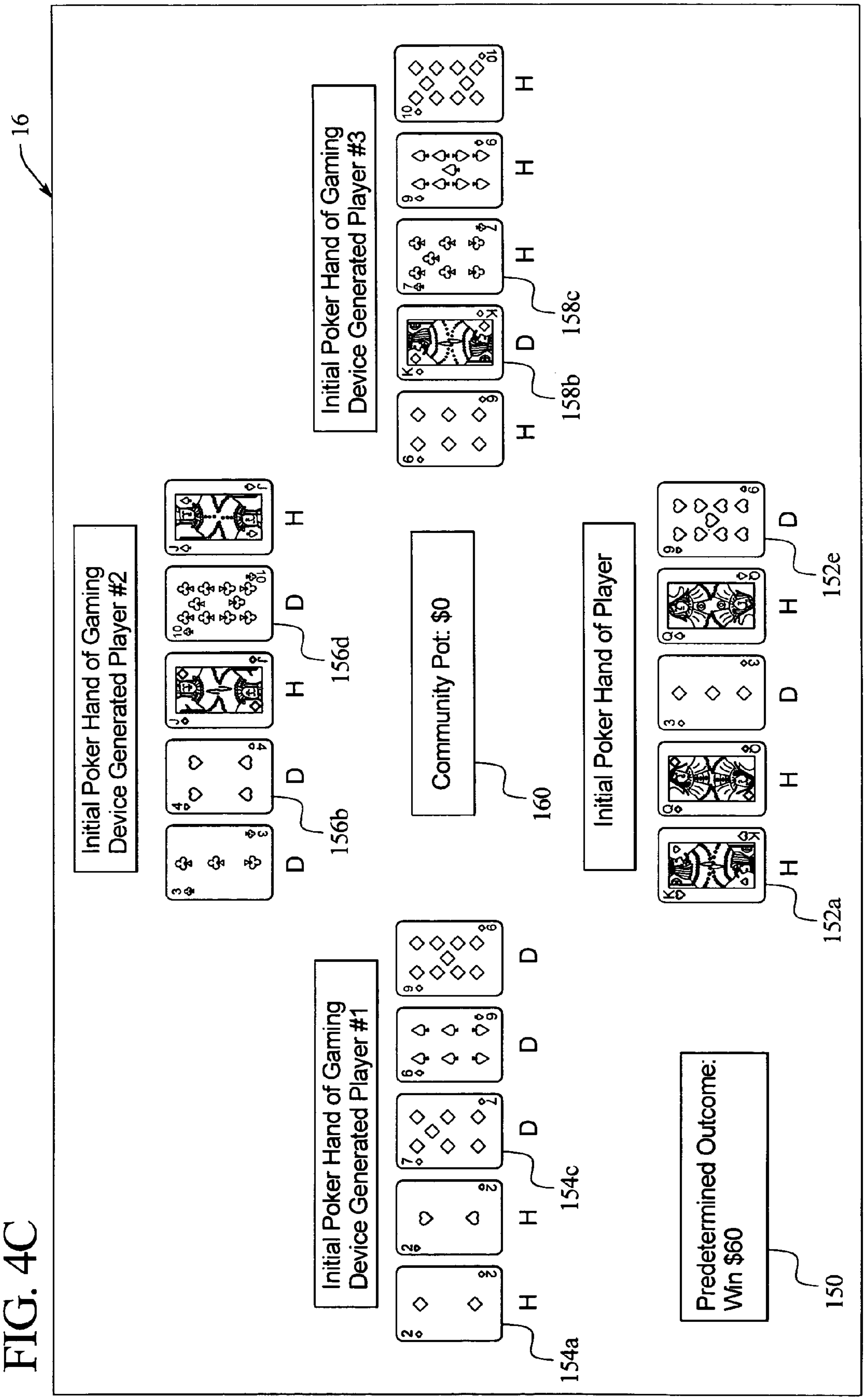
Figure 4D:
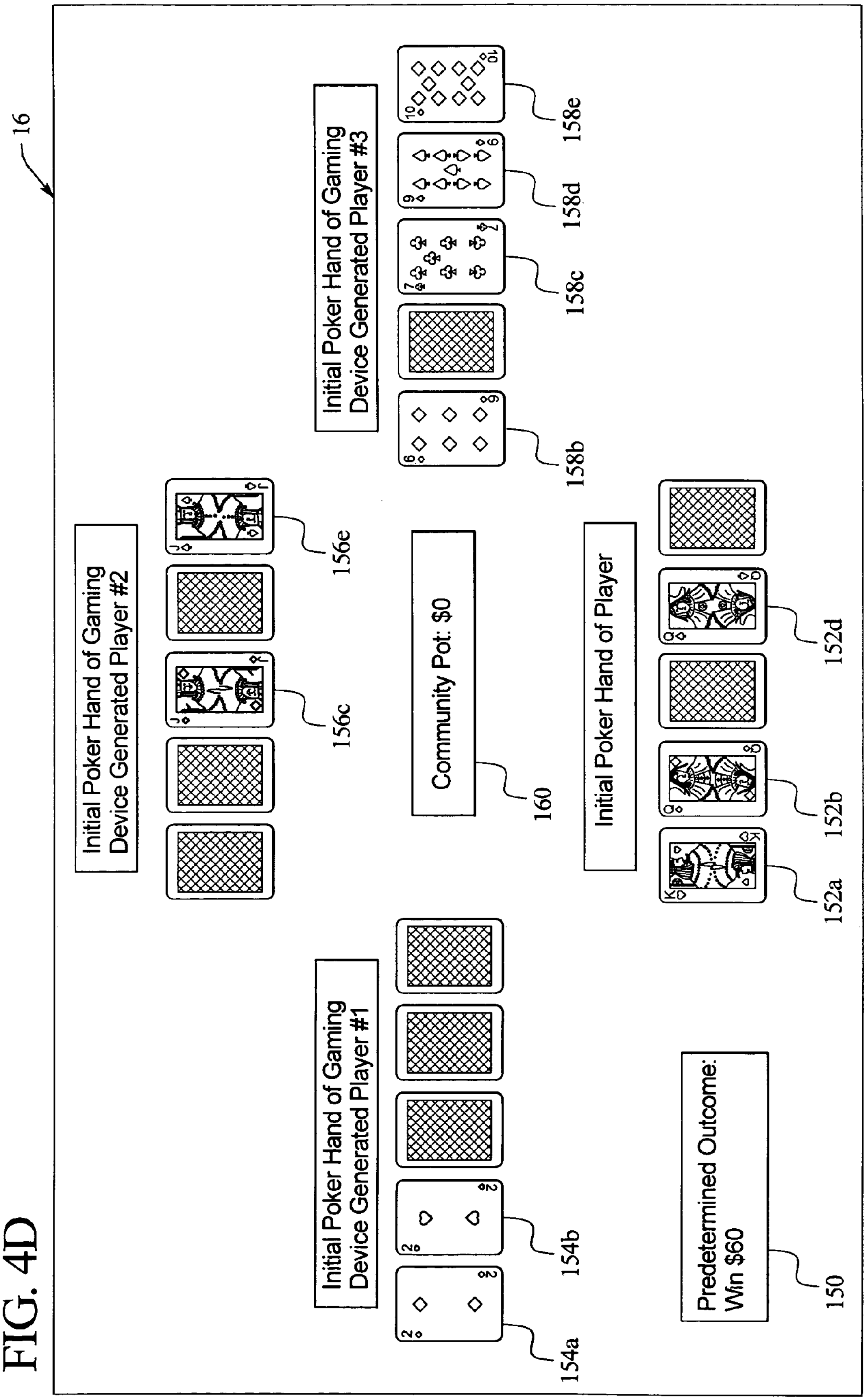

As illustrated in FIGS. 4C and 4D, the player is enabled to designate one or more of their initially dealt playing cards as a hold or a discard using one or more hold/discard buttons 60 or the touch screen. In this case, the player decided to hold the king of hearts 152*a* and the pair of queens 152*b* and 152*d* and discard the remaining cards 152*c* and 152*e*.

After the player determines which playing cards to hold or discard, for each gaming device generated competitor, the gaming device determines which provided competing playing cards to hold or discard. In one embodiment, the gaming device determines which gaming device generated competitors playing cards to hold or discard based on a predetermined strategy. In another embodiment, the gaming device randomly determines which gaming device generated competitors playing cards to hold or discard. In another embodiment, the gaming device determines which gaming device generated competitors playing cards to hold or discard based on based on the selected predetermined game outcome and which cards the player selects to hold or discard.

As seen in FIGS. 4C and 4D, in this case, the gaming device determined that the first gaming device generated competitor will hold the initially dealt pair of twos 154*a* and 154*b* and discard the remaining cards 154*c*, 154*d* and 154*e*. The gaming device also determined that the second gaming device generated competitor will hold the pair of jacks 156*c* and 156*e* and discard the remaining cards 156*a*, 156*b* and 156*d*. The gaming device determined that the third gaming device generated competitor will try for the straight and thus discard the king of diamonds 158*b* and hold all of the remaining initially dealt cards 158*a*, 158*c*, 158*d* and 158*e*.

Figure 4E:
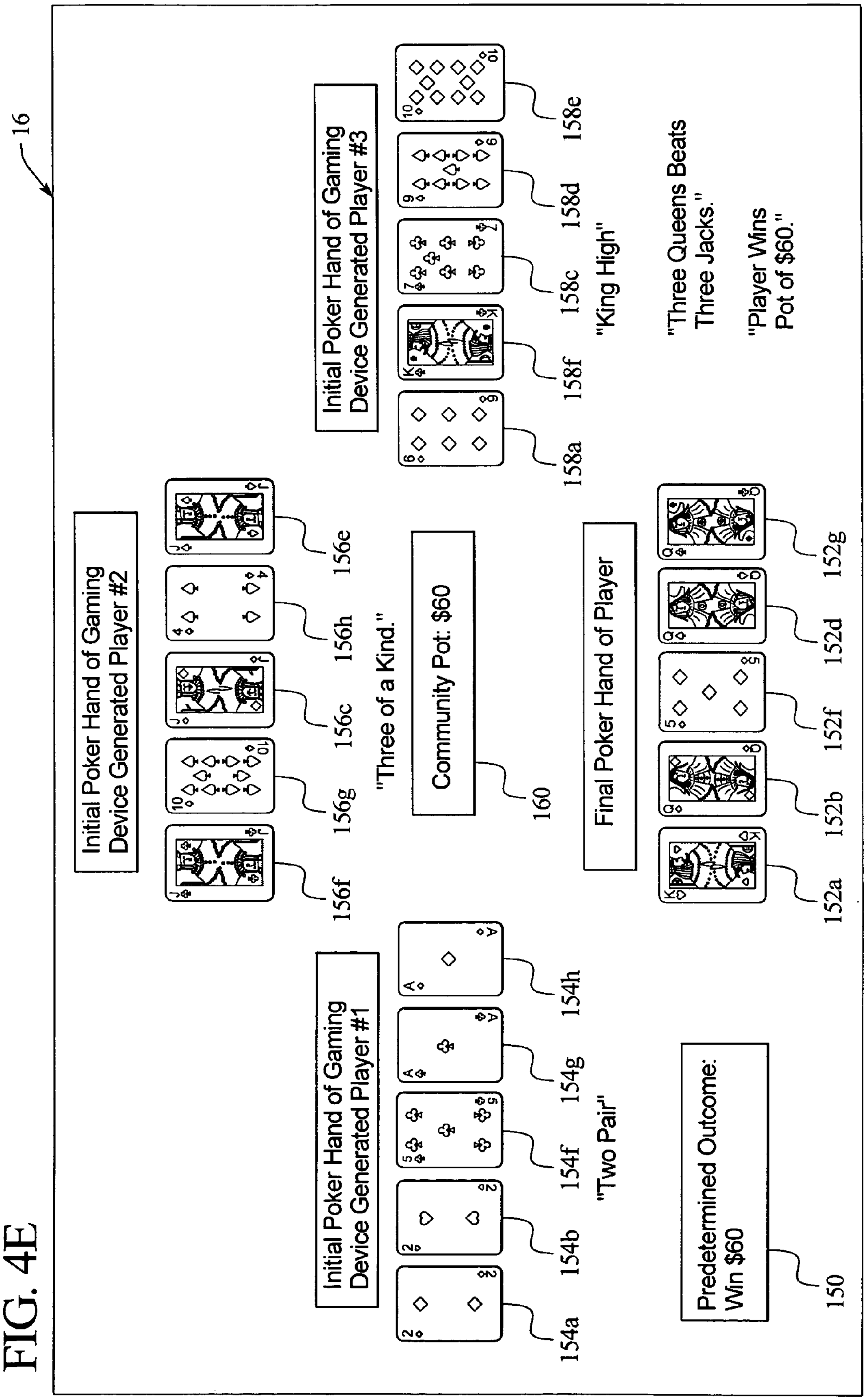

As illustrated in FIG. 4E, for each discarded playing card, the gaming device provides or deals the player a new playing card to replace the discarded playing card, wherein one of more of the new playing cards are at least partially based on the predetermined game outcome. In this case, the gaming device provided the player with a five of diamonds 152*f* and a queen of clubs 152*g*. The combination of the held playing cards and the new playing cards form a second poker hand, in this case three queens.

In one embodiment, once the player has been dealt a second poker hand, the gaming device determines based on the player's second poker hand and the predetermined game outcome, the competing second poker hands to provide to each of the gaming device generated competitors. For example, as the player's second poker hand is three queens and the predetermined outcome is a win outcome, the gaming device will determine that none of the gaming device generated competitors competing second poker hands can beat or trump the player's three queens. In this embodiment, the gaming device then provides each of the generated competitors a competing second poker hand (i.e. by replacing each discarded playing card with a new playing card) wherein none of the generated competitors competing second poker hands beat the player's three queens.

As seen in FIG. 4E, the gaming device provided the first gaming device generated competitor with a five of clubs 154*f*, the ace of clubs 154*g* and the ace of diamonds 154*h*. The first gaming device generated competitor competing second poker hand is thus two pairs which does not beat the player's three queens. The gaming device provided the second gaming device generated competitor the jack of clubs 156*f*, ten of spades 156*g* and four of spades 156*h*. The second gaming device generated competitor competing second poker hand is thus three jacks which does not beat the player's three queens. The gaming device provided the third gaming device generated competitor the king of clubs 158*f* and thus the third gaming device generated competitor competing second poker hand is a king high which does not beat the player's three queens.

The player's second poker hand is then compared to each of the generated competitors competing second poker hands. In this case, as the predetermined game outcome is a win outcome, the gaming device has controlled each of the competitors competing second poker hands such that the player's second poker hand will beat each of the gaming device generated competitors competing second poker hands and the player is provided the community pot. As the gaming device generated competitors have previously placed bets into the community pot equaling the value associated with the predetermined outcome, the player is provided the selected predetermined game outcome and the interactive poker game ends. Appropriate messages such as "THREE QUEENS BEATS THREE JACKS" and "PLAYER WINS POT OF $60" are preferably provided to the player visually, or through suitable audio or audiovisual displays.

In another example, if the predetermined game outcome was a loss outcome, then during the determinations regarding each of the competitors poker hands (i.e., which cards to hold/discard and which cards to provide for each discarded playing card), the gaming device would have controlled each of the competitors poker hands to insure that at least one of the competitors competing second poker hands beats or trumps the player's second poker hand. In this example, the player is displayed as losing the poker game and the predetermined game outcome (which is associated with a value of $0) is provided to the player.

In an alternative embodiment of the present invention, the manner in which the predetermined game outcome is provided to the player is determined, at least in part, based on the player's second poker hand, how the player plays their initially provided poker hand and one of a plurality of static paytables. In this embodiment, a paytable is utilized with the player's second poker hand to determine a payout or value which represents at least part of the payout or value associated with the predetermined game outcome which is ultimately provided to the player. This embodiment proceeds as described above with the player provided an initial poker hand, each of the gaming device generated competitors displayed as provided an initial poker hand and the player discarding or holding at least one provided playing card. In this embodiment, depending on which initially provided playing cards the player decides to hold or discard, zero, one or more of the gaming device generated competitors may fold or drop out of the poker game. The number of gaming device generated competitors remaining at the end of the poker game (i.e., the number of generated competitors which have not folded their poker hands) determines a modifier or multiplier which is utilized with any payout determined in accordance with the appropriate paytable. In one embodiment, the number of remaining generated competitors represents the modifier to be utilized, such that one remaining generated competitor equates to a modifier of one, two remaining generated competitors equate to a modifier of two and so on.

In one embodiment, if the player plays their initial poker hand according to a predetermined or optimal hold strategy to obtain a second poker hand, then according to the utilized paytable, the payout or value associated with the second poker hand will correspond with the payout or value associated with the predetermined game outcome. In this example, if the player plays their initial poker hand according to the optimal strategy, then all but one of the generated competitors will drop out of the poker game (i.e., a modifier of one) and any payout or value associated with the player's second poker hand (i.e., with reference to an appropriate paytable) will correspond with the payout associated with the predetermined game outcome. For example, if the predetermined game outcome is a win $20 outcome and the player played according to the optimal hold strategy to obtain a second poker hand, then according to the appropriate paytable, a $20 payout is associated with the player's second hand, which when modified by a modifier of one (i.e., because all but one of the generated competitors dropped out) results in a modified payout of $20 provided to the player.

On the other hand, in one embodiment, if the player does not play their initially provided cards according to the optimal hold strategy to obtain a second poker hand, any payout or value associated with the obtained second poker hand (with reference to an appropriate paytable) will be provided to the player. In this embodiment, as the player did not play according to the optimal hold strategy, a plurality of generated competitors will remain in the game and thus a greater modifier will be utilized to modify any payout or value provided to the player via the paytable. It should be appreciated that the combination of the lower award or payout (i.e., due to the player's sub-optimal play) coupled with the higher modifier (i.e., due to the player's sub-optimal player) will result in a modified payout or value for the player which equals the payout or value associated with the predetermined game outcome. It should be further appreciated that the degree by which the player deviates from the optimal hold strategy will directly effect the payout provided to the player for the player's second poker hand as well as directly effect the modifier (illustrated as the number of generated competitors remaining) in the poker game.

For example, if the predetermined game outcome is a win $20 game outcome and the player slightly deviates from the optimal hold strategy in obtaining a second poker hand, then all but two of the generated competitors drop out of the poker game (i.e., resulting in a modifier of two) and with reference to an appropriate paytable, the player's second poker hand is associated with a value of $10. In this example, the value of $10 is modified by the determined modifier of two to result in a modified payout value of $20 which corresponds with the predetermined game outcome. In another example with a win $20 predetermined game outcome, if the player greatly deviates from the optimal hold strategy in obtaining a second poker hand, then all but four of the generated competitors drop out of the poker game (i.e., resulting in a modifier of four) and with reference to an appropriate paytable, the player's second poker hand is associated with a value of $5. In this example, the value of $5 is modified by the determined modifier of four to result in a modified payout value of $20 which also corresponds with the predetermined game outcome. Thus, in this embodiment, regardless of the degree which the player deviates from the optimal hold strategy, the gaming device will always provide the value or payout associated with the predetermined game outcome to the player.

In another embodiment utilizing one or more of a plurality of static paytables, the total payout provided to a player is based on a combination of any payout determined using an appropriate one of the static paytables as well as any payout determined by comparing the player's second poker hand to one or more competing second poker hands. In this embodiment, the gaming device proceeds as described above with the player provided an initial poker hand, each of the gaming device generated competitors displayed as provided an initial poker hand and the player discarding or holding at least one provided playing card. If the player plays their poker hand according to a predetermined or optimal hold strategy to obtain a second poker hand, then according to the utilized paytable, the payout or value associated with the second poker hand will correspond with the payout or value associated with the predetermined game outcome. For example, if the predetermined game outcome is a win $20 outcome and the player played according to the optimal hold strategy to obtain a second poker hand, then according to the appropriate paytable, a $20 payout is associated with the player's second hand is provided to the player.

On the other hand, in one embodiment, if the player does not play their initially provided cards according to an optimal hold strategy to obtain a second poker hand, then any payout or value associated with the obtained second poker hand (with reference to an appropriate paytable) will be provided to the player. In this case, the gaming device determines one or more supplemental payouts to provide to the player. Any supplemental payouts coupled with any payout associated with the obtained second poker hand results in a payout which corresponds with the payout or value associated with the predetermined game outcome. In one embodiment, the gaming device determines the supplemental payouts by comparing the player's second poker hand to one or more of the individual competing second poker hands. In this embodiment, the gaming device determines if the player's second poker hand beats or trumps one or more of the competing second poker hands. For each competing second poker hand which the gaming device determined was beaten or trumped by the player's second poker hand, a supplemental payout is provided to the player. It should be appreciated that in this embodiment, as described above, the gaming device determines each of the competing second poker hands in light of any payout associated with the obtained poker hand to insure that the total payout provided to the player (either via the payout associated with the obtained second poker hand according to the paytable or via a comparison with one of the individual competing second poker hands) corresponds with the payout or value associated with the predetermined game outcome.

For example, if the predetermined game outcome is a win $20 game outcome and based on the player's sub-optimal play of their initial playing cards, the player's second poker hand (with reference to an appropriate paytable) is associated with a payout of $10, then the gaming device must determine one or more supplemental payouts which total $10 to result in a total payout of $20 provided to the player. In one embodiment, based on the player's second poker hand and the need for the player's second poker hand to trump or beat at least one of the competing second poker hands (i.e., to obtain a supplemental payout), the gaming device will provide one of the generated competitors a competing second poker hand which will be beaten or trumped by the player's second poker hand. In this embodiment, the player is provided the supplemental payout of $10 for having a better poker hand than the competing poker hand and thus the player's total payout of $20 corresponds with the payout associated with the predetermined game outcome. In another embodiment, the gaming device will provide a plurality of competing second poker hands which are each beaten or trumped by the player's second poker hand. For example, if two competing second poker hands which are each beaten or trumped by the player's second poker hand are provided, then the player is provided a supplemental payout of $5 for each trumped competing second poker hand and thus the player's total payout of $20 corresponds with the payout associated with the predetermined game outcome. In another embodiment, the amount of the supplemental payout, while determined based on the payout associated with the predetermined game outcome, is displayed to the player as being determined based on the degree which the player's second poker hand beats or trumps at least one of the competing second poker hands.

In another embodiment of the present invention, the player and at least one of the gaming device generated competitors are dealt or provided the same initial poker hand as if the player and the generated competitor are playing from identical decks of playing cards. In this embodiment, the gaming device generated competitor with the same initial poker hand will hold or discard the playing cards of the initial poker hand according to a predetermined or optimal hold strategy while the player is free to hold or discard any playing cards the player wants as described above. After the player and each generated competitor has designated which playing cards to discard, but before any new playing cards are provided to replace the designated discarded playing cards, the gaming device determines which playing cards to provide to the player and each of the generated competitors. As described above, the determination is based on the predetermined game outcome, such that if the predetermined game outcome is a win outcome, the player's second poker hand beats each of the competing second hands and if the predetermined game outcome is a loss outcome, at least one of the competing second poker hands will beat the player's second poker hand.

In another embodiment wherein the player and at least one of the gaming device generated competitors are dealt or provided the same initial poker hand, the payout associated with the player's second poker hand is determined utilizing an appropriate paytable as described above. In this embodiment, if the player's second poker hand beats the competing second poker hand of the competitor with the same initial playing cards, the payout associated with the player's second poker hand is modified or the player is provided a supplemental payout. In another embodiment, a bonus feature wherein the player is provided one or more supplemental payouts is triggered if based on the player's decisions regarding which cards to hold/discard, the player's second poker hand beats the competitor second poker hands. In an alternative embodiment, if the player's second poker hand beats the competitor second poker hands, the player may be provided a supplemental payout from a pool with a higher average supplemental payout than a pool which the player is provided a supplemental payout from if the competitor second poker hands beat the player's second poker hand. It should be appreciated that in these embodiment, the total payout provided to the player (i.e., any modified payout or any payout obtained based on the player's second poker hand coupled with any provided supplemental payout) equals the payout associated with the predetermined game outcome.

In an alternative embodiment, the gaming device of the present invention is operable with a randomly determined game outcome. In this embodiment, upon the initiation of the gaming device, a randomly determined game outcome is determined using one or more random number generating algorithms. The gaming device then proceeds as described above and via controlling each of the competitors playing cards the randomly determined game outcome is provided to the player.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one input device;

at least one display device;

at least one processor; and at least one memory device which stores a plurality of instructions, which when executed by the at least one processor, cause the at least one processor to operate with said at least one display device and the at least one input device to, for each play of an interactive poker game which includes a plurality of playing cards, control said play of the interactive poker game by:

(a) determining and displaying a plurality of said playing cards to a player to form an initial player poker hand;

(b) determining and displaying a plurality of said playing cards to form at least one initial competing virtual poker hand, at least one of said playing cards in said initial competing virtual poker hand being based on a predetermined game outcome that is selected from a plurality of different predetermined game outcomes;

(c) enabling the player to designate at least one of said playing cards in said initial player poker hand to hold or to discard;

(d) determining which playing cards in said initial competing virtual poker hand to designate to hold or to discard;

(e) determining and selecting another one of said playing cards for each playing card the player designated to discard, wherein at least one of said selected playing cards in the player's hand is based on the selected predetermined game outcome;

(f) displaying said selected playing cards replacing the playing cards in the initial player poker hand that the player designated to discard, wherein said held playing cards and said selected playing cards form a second player poker hand;

(g) for each initial competing virtual poker hand:

(i) determining and selecting another one of said playing cards for each playing card designated to discard, wherein at least one of said selected playing cards is based on said selected predetermined game outcome, and (ii) displaying said selected playing cards replacing the playing cards in the initial competing virtual poker hand that were designated to discard, wherein said held playing cards and said selected playing cards form a second competing virtual poker hand;

(h) displaying a comparison of the second player poker hand to each of said second competing virtual poker hands; and (i) providing the player said selected predetermined game outcome.

2. The gaming device of claim 1, wherein at least one of said playing cards in said initial player poker hand is based on said selected predetermined game outcome.

3. The gaming device of claim 1, wherein a plurality of said playing cards in said initial player poker hand and a plurality of playing cards in said initial competing virtual poker hand are based on said selected predetermined game outcome.

4. The gaming device of claim 1, wherein each of said playing cards in said initial player poker hand and each of said playing cards in said initial competing virtual poker hand are based on said selected predetermined game outcome.

5. The gaming device of claim 1, wherein the player is enabled to designate a plurality of said playing cards in said initial player poker hand to hold or to discard.

6. The gaming device of claim 1, wherein the player is enabled to designate each of said playing cards in said initial player poker hand to hold or to discard.

7. The gaming device of claim 1, wherein the processor is operable to control the play of the interactive poker game by displaying at least one generated competitor placing at least one bet into a community pot.

8. The gaming device of claim 7, wherein if the selected predetermined game outcome is a win outcome with an associated value, the bets placed into the community pot by the generated competitor equals the value associated with the selected predetermined game outcome.

9. The gaming device of claim 7, wherein if the selected predetermined game outcome is a loss outcome, a randomly determined amount of bets are placed into the community pot by the generated competitor.

10. The gaming device of claim 1, wherein said selected predetermined game outcome is selected from a memory device of said gaming device.

11. The gaming device of claim 1, wherein said selected predetermined game outcome is selected by and received from a central controller.

12. A gaming device comprising:

at least one input device;

at least one display device;

at least one processor; and at least one memory device which stores a plurality of instructions, which when executed by the at least one processor, cause the at least one processor to operate with said display device and the at least one input device, for each play of an interactive poker game which includes a plurality of playing cards, to control said play of the interactive poker game by:

(a) determining and displaying a plurality of said playing cards to the player to form an initial player poker hand;

(b) determining and displaying a plurality of said playing cards to form at least one initial competing virtual poker hand;

(c) if a selected one of a plurality of different predetermined game outcomes is a win outcome associated with a value, displaying at least one generated competitor placing at least one value into a community pot, wherein said placed values equal the value associated with the predetermined game outcome and each of said plurality of predetermined game outcomes is either a win outcome associated with a value or a loss outcome;

(d) enabling the player to designate at least one of said playing cards in said initial player poker hand to hold or to discard;

(e) determining which playing cards in said initial competing virtual poker hand to designate to hold or to discard;

(f) determining and selecting another one of said playing cards for each playing card the player designated to discard, wherein at least one of said selected playing cards in the player's hand is based on said selected predetermined game outcome;

(g) displaying said selected playing cards replacing the playing cards in the initial player poker hand that the player designated to discard, wherein said held playing cards and said selected playing cards form a second player poker hand;

(h) for each initial competing virtual poker hand:

(i) determining and selecting another one of said playing cards for each playing card designated to discard, wherein at least one of said selected playing cards is based on said selected predetermined game outcome; and (ii) displaying said selected playing cards replacing said playing cards in the initial competing virtual poker hand that were designated to discard, wherein said held playing cards and said selected playing cards form a second competing virtual poker hand;

(i) displaying a comparison of the players second poker hand to each of said displayed second competing virtual poker hands; and (j) providing the player said selected predetermined game outcome.

13. The gaming device of claim 12, wherein at least one of said playing cards in said initial player poker hand is based on said selected predetermined game outcome.

14. The gaming device of claim 12, wherein at least one of said playing cards in said initial competing virtual poker hand is based on said selected predetermined game outcome.

15. The gaming device of claim 12, wherein a plurality of said playing cards in said initial player poker hand and a plurality of playing cards in said initial competing virtual poker hand are based on said selected predetermined game outcome.

16. The gaming device of claim 12, wherein each of said playing cards in said initial player poker hand and each of said playing cards in said initial competing virtual poker hand are based on said selected predetermined game outcome.

17. The gaming device of claim 12, wherein the player is enabled to designate a plurality of said playing cards in said initial player poker hand to hold or to discard.

18. The gaming device of claim 12, wherein the player is enabled to designate each of said playing cards in said initial player poker hand to hold or to discard.

19. The gaming device of claim 12, wherein if the predetermined game outcome is a loss outcome, a randomly determined amount of bets are placed into the community pot by the generated competitor.

20. The gaming device of claim 12, wherein said selected predetermined game outcome is selected from a memory device of said gaming device.

21. The gaming device of claim 12, wherein said selected predetermined game outcome is selected by and received from a central controller.

22. A central determination gaming system comprising:

a central controller configured to operate to:

(i) store a pool of predetermined game outcomes wherein at least two of said predetermined game outcomes are different, (ii) select one of said predetermined game outcomes from said pool of predetermined game outcomes, (iii) prevent said selected predetermined game outcome from further selections from said pool, and (iv) output said selected predetermined game outcome; and at least one gaming device including a display device and a processor in communication with said display device, said processor configured to operate, for each play of a poker game, to:

(a) enable a player to initiate the poker game, wherein said poker game includes a plurality of playing cards;

(b) receive said selected predetermined game outcome from said central controller;

(c) determine and display a plurality of said playing cards to the player to form an initial player poker hand;

(d) determine and display a plurality of said playing cards to form at least one initial competing virtual poker hand, at least one of said playing cards in said at least one initial competing virtual poker hand being based on said selected predetermined game outcome;

(e) enable the player to designate at least one of said playing cards in said initial player poker hand to hold or to discard;

(f) determine which playing cards in said initial competing virtual poker hand to designate to hold or to discard;

(g) determine and select another one of said playing cards for each playing card the player designated to discard, wherein at least one of said selected playing cards is based on said selected predetermined game outcome;

(h) display said selected playing cards replacing the playing cards in the initial player poker hand that the player designated to discard, wherein said held playing cards and said selected playing cards form a second player poker hand;

(i) for each initial competing virtual poker hand:

(i) determine and select another one of said playing cards for each playing card designated to discard, wherein at least one of said selected playing cards is based on said selected predetermined game outcome, and (ii) display said selected playing cards replacing the playing cards in the initial competing virtual poker hand that were designated to discard, wherein said held playing cards and said selected playing cards form a second competing virtual poker hand;

(j) display a comparison of the second player poker hand to each of said second competing virtual poker hands; and (k) provide the player said selected predetermined game outcome.

23. The central determination gaming system of claim 22, wherein at least one of said playing cards in said initial player poker hand is based on said selected predetermined game outcome.

24. The central determination gaming system of claim 22, which includes a plurality of pools of game outcomes.

25. The central determination gaming system of claim 22, wherein a plurality of said playing cards in said initial player poker hand and a plurality of playing cards in said initial competing virtual poker hand are based on said selected predetermined game outcome.

26. The central determination gaming system of claim 22, wherein each of said playing cards in said initial player poker hand and each of said playing cards in said initial competing virtual poker hand are based on said selected predetermined game outcome.

27. The central determination gaming system of claim 22, wherein the player is enabled to designate a plurality of said playing cards in said initial player poker hand to hold or to discard.

28. The central determination gaming system of claim 22, wherein the player is enabled to designate each of said playing cards in said initial player poker hand to hold or to discard.

29. The central determination gaming system of claim 22, wherein the gaming device processor is operable to control the play of the poker game by displaying at least one generated competitor placing at least one bet into a community pot.

30. The central determination gaming system of claim 29, wherein if the selected game outcome is a win outcome with an associated value, the bets placed into the community pot by the generated competitor equals the value associated with the selected predetermined game outcome.

31. The central determination gaming system of claim 29, wherein if the predetermined game outcome is a loss outcome, a randomly determined amount of bets are placed into the community pot by the generated competitor.

32. The central determination gaming system of claim 22, wherein the pool of predetermined game outcomes includes a plurality of loss outcomes and a plurality of different win outcomes, wherein each different win outcome is associated with a different value.

33. A gaming device comprising:

at least one input device, at least one display device;

at least one processor; and at least one memory device which stores a plurality of instructions, which when executed by the at least one processor, cause the at least one processor to operate with said display device and the at least one input device for each play of an interactive poker game which includes a plurality of playing cards to control said play of the interactive poker game by:

(a) determining and displaying a plurality of said playing cards to the player to form an initial player poker hand;

(b) displaying an image of at least one competing virtual poker hand without determining or displaying a rank and a suit of which of said playing cards are in said competing virtual poker hand;

(c) enabling the player to designate at least one of said playing cards in said initial player poker hand to hold or to discard;

(d) determining and selecting another one of said playing cards for each playing card the player designated to discard;

(e) displaying said selected playing cards replacing the playing cards in the initial player poker hand that the player designated to discard, wherein said held playing cards and said selected playing cards form a second player poker hand;

(f) for each displayed image of a competing virtual poker hand, determining and displaying a plurality of playing cards to include in said competing virtual poker hand, wherein said determination is based on said second player poker hand and a selected one of a plurality of predetermined game outcomes, and each of said predetermined game outcomes is either a win outcome associated with a value or a loss outcome;

(g) if the selected predetermined game outcome is a loss outcome, displaying at least one generated competitor placing a randomly determined amount of bets into a community pot;

(h) displaying a comparison of the second player poker hand to each of said competing virtual poker hands; and (i) providing the player said selected predetermined game outcome.

34. The gaming device of claim 33, wherein at least one of said playing cards in said initial player poker hand is based on said selected predetermined game outcome.

35. The gaming device of claim 33, wherein at least one of said selected playing cards selected to replace one of said playing cards designated to discard is based on said selected predetermined game outcome.

36. The gaming device of claim 33, wherein a plurality of said playing cards in said initial player poker hand are based on said selected predetermined game outcome.

37. The gaming device of claim 33, wherein each of said playing cards in said initial player poker hand are based on said selected predetermined game outcome.

38. The gaming device of claim 33, wherein the player is enabled to designate a plurality of said playing cards in said initial player poker hand to hold or to discard.

39. The gaming device of claim 33, wherein the player is enabled to designate each of said playing cards in said initial player poker hand to hold or to discard.

40. The gaming device of claim 33, wherein if the selected predetermined game outcome is a win outcome with an associated value, the processor is operable to control the play of the interactive poker game by displaying the at least one generated competitor placing bets into the community pot which equal the value associated with the selected predetermined game outcome.

41. The gaming device of claim 33, wherein said selected predetermined game outcome is selected from a memory device of said gaming device.

42. The gaming device of claim 33, wherein said selected predetermined game outcome is selected by and received from a central controller.

43. The gaming device of claim 33, wherein each of said playing cards provided to the player are independent of said selected predetermined game outcome.

44. A central determination gaming system comprising:

a central controller configured to operate to:

(i) store a pool of predetermined game outcomes, wherein at least two of said predetermined game outcomes are different, (ii) select one of said predetermined game outcomes from said pool of predetermined game outcomes, (iii) prevent said selected predetermined game outcome from further selections from said pool, and (iv) output said selected predetermined game outcome; and at least one gaming device including a display device and a processor in communication with said display device, said processor configured to operate, for each play of a poker game, to:

(a) enable a player to initiate the poker game, wherein said poker game includes a plurality of playing cards;

(b) receive said selected game outcome from said central controller;

(c) determine and display a plurality of said playing cards to the player to form an initial player poker hand;

(d) display an image of at least one competing virtual poker hand without determining or displaying a rank and a suit of which of said playing cards are in said competing virtual poker hand;

(e) enable the player to designate at least one of said playing cards in said initial player poker hand to hold or to discard;

(f) determine and select another one of said playing cards for each playing card the player designated to discard;

(g) display said selected playing cards replacing the playing cards in the initial player poker hand that the player designated to discard, wherein said held playing cards and said selected playing cards form a second player poker hand;

(h) for each displayed image of a competing virtual poker hand, determine and display a plurality of playing cards to include in said competing virtual poker hand, wherein said determination is based on said second player poker hand and the selected predetermined game outcome;

(i) if the selected predetermined game outcome is a loss outcome, displaying at least one generated competitor placing a randomly determined amount of bets into a community pot;

(j) display a comparison of the second player poker hand to each of said competing virtual poker hands; and (k) provide the player said selected predetermined game outcome.

45. The central determination gaming system of claim 44, wherein at least one of said playing cards in said initial player poker hand is based on said selected predetermined game outcome.

46. The central determination gaming system of claim 44, which includes a plurality of pools of game outcomes.

47. The central determination gaming system of claim 44, wherein a plurality of said playing cards in said initial player poker hand are based on said selected predetermined game outcome.

48. The central determination gaming system of claim 44, wherein each of said playing cards in said initial player poker hand are based on said selected predetermined game outcome.

49. The central determination gaming system of claim 44, wherein the player is enabled to designate a plurality of said playing cards in said initial player poker hand to hold or to discard.

50. The central determination gaming system of claim 44, wherein the player is enabled to designate each of said playing cards in said initial player poker hand to hold or to discard.

51. The central determination gaming system of claim 44, wherein if the selected game outcome is a win outcome with an associated value, said processor is configured to operate, for each play of the poker game, to display the at least one generated competitor placing bets into the community pot which equal the value associated with the selected game outcome.

52. The central determination gaming system of claim 44, wherein the pool of predetermined game outcomes includes a plurality of loss outcomes and a plurality of different win outcomes, wherein each different win outcome is associated with a different value.

53. The central determination gaming system of claim 44, wherein each of said playing cards provided to the player are independent of said selected predetermined game outcome.

54. A gaming device comprising:

at least one input device;

at least one display device;

at least one processor; and at least one memory device which stores a plurality of instructions, which when executed by the at least one processor, cause the at least one processor to operate with said display device and the at least one input device for each play of an interactive poker game which includes a plurality of playing cards, to control said play of the interactive poker game by:

(a) determining and displaying an initial player poker hand, wherein the initial player poker hand includes a plurality of said playing cards;

(b) determining and displaying at least one initial competing virtual poker hand, wherein each initial competing virtual poker hand includes a plurality of said playing cards;

(c) enabling the player to designate at least one of said playing cards in said initial player poker hand to hold or to discard;

(d) determining and displaying a second player poker hand, wherein said second player poker hand is based on said player's designations and a selected one of a plurality of predetermined game outcomes, and each of said predetermined game outcomes is either a win outcome associated with a value or a loss outcome;

(e) determining and displaying at least one second competing virtual poker hand, wherein each second competing virtual poker hand is based on said selected predetermined game outcome;

(f) if the selected predetermined game outcome is a win outcome with an associated value, displaying at least one generated competitor placing at least one bet into a community pot, wherein the bets placed into the community pot by the at least one generated competitor equal the value associated with the selected predetermined game outcome;

(g) displaying a comparison of the second player poker hand to each of said second competing virtual poker hands; and (h) providing the player said selected predetermined game outcome.

55. The gaming device of claim 54, wherein if the selected predetermined game outcome is a loss outcome, the processor is operable to control the play of the interactive poker game by displaying a randomly determined amount of bets placed into the community pot by the at least one generated competitor.

56. The gaming device of claim 54, wherein said selected predetermined game outcome is selected from a memory device of said gaming device.

57. The gaming device of claim 54, wherein said selected predetermined game outcome is selected by and received from a central controller.

58. A method of operating a gaming device, for each play of a poker game, said method comprising:

(a) causing at least one processor to execute a plurality of instructions to determine a plurality of playing cards to form an initial player poker hand;

(b) causing at least one display device to display to a player the determined plurality of playing cards which form the initial player poker hand;

(c) causing the at least one processor to execute the plurality of instructions to determine a plurality of said playing cards to form at least one initial competing virtual poker hand, at least one of said playing cards in said at least one initial competing virtual poker hand being based on a predetermined game outcome selected from a plurality of predetermined game outcomes;

(d) causing the at least one display device to display the determined plurality of said playing cards which form said at least one initial competing virtual poker hand;

(e) enabling the player to designate at least one of said playing cards in said initial player poker hand to hold or to discard;

(f) causing the at least one processor to execute the plurality of instructions to determine which playing cards in said initial competing virtual poker hand to designate to hold or to discard;

(g) causing the at least one processor to execute the plurality of instructions to determine and select another one of said playing cards for each playing card the player designated to discard, wherein at least one of said selected playing cards is based on said selected predetermined game outcome;

(h) causing the at least one display device to display said selected playing cards replacing the playing cards in the initial player poker hand that the player designated to discard, wherein said held playing cards and said selected playing cards form a second player poker hand;

(i) for each initial competing virtual poker hand:

(i) causing the at least one processor to execute the plurality of instructions to determine and select another one of said playing cards for each playing card designated to discard, wherein at least one of said selected playing cards is based on said selected predetermined game outcome, and (ii) causing the at least one display device to display said selected playing cards replacing the playing cards in the initial competing virtual poker hand that were designated to discard, wherein said held playing cards and said selected playing cards form a second competing virtual poker hand;

(j) causing the at least one display device to display a comparison of the second player poker hand to each of said second competing virtual poker hands; and (k) providing the player said selected predetermined game outcome.

59. The method of claim 58, wherein at least one of said playing cards in said initial player poker hand is based on said selected predetermined game outcome.

60. The method of claim 58, wherein a plurality of said playing cards in said initial player poker hand and a plurality of playing cards in said initial competing virtual poker hand are based on said selected predetermined game outcome.

61. The method of claim 58, wherein each of said playing cards in said initial player poker hand and each of said playing cards in said initial competing virtual poker hand are based on said selected predetermined game outcome.

62. The method of claim 58, which includes enabling the player to designate a plurality of said playing cards in said initial player poker hand to hold or to discard.

63. The method of claim 58, which includes enabling the player to designate each of said playing cards in said initial player poker hand to hold or to discard.

64. The method of claim 58, which includes causing the at least one display device to display at least one generated competitor placing at least one bet into a community pot.

65. The method of claim 64, wherein if the selected predetermined game outcome is a win outcome with an associated value, the bets placed into the community pot by the generated competitor equals the value associated with the selected predetermined game outcome.

66. The method of claim 64, which includes placing a randomly determined amount of bets into the community pot by the generated competitor if the selected predetermined game outcome is a loss outcome.

67. The method of claim 58, wherein steps (a) to (k) are provided to the player through a data network.

68. The method of claim 67, wherein the data network is an internet.

69. A method of operating a gaming device, for each play of a poker game, said method comprising:

(a) causing at least one display device to display a plurality of playing cards to a player to form an initial player poker hand;

(b) causing at least one processor to execute a plurality of instructions to determine a plurality of said playing cards to form at least one initial competing virtual poker hand;

(c) causing the at least one display device to display the determined plurality of said playing cards which form the at least one initial competing virtual poker hand;

(d) if a predetermined game outcome selected from a plurality of predetermined game outcomes is a win outcome, causing the at least one display device to display at least one generated competitor placing at least one value into the community pot, wherein said placed values equal the value associated with the predetermined game outcome;

(e) enabling the player to designate at least one of said playing cards in said initial player poker hand to hold or to discard;

(f) causing the at least one processor to execute the plurality of instructions to determine which playing cards in said initial competing virtual poker hand to designate to hold or to discard;

(g) causing the at least one processor to execute the plurality of instructions to determine and select another one of said playing cards for each playing card the player designated to discard, wherein at least one of said selected playing cards is based on said selected predetermined game outcome;

(h) causing the at least one display device to display said selected playing cards replacing the playing cards in the initial player poker hand that the player designated to discard, wherein said held playing cards and said selected playing cards form a second player poker hand;

(i) for each initial competing virtual poker hand:

(i) causing the at least one processor to execute the plurality of instructions to determine and select another one of said playing cards for each playing card designated to discard, wherein at least one of said selected playing cards is based on said selected predetermined game outcome; and (ii) causing the at least one display device to display said selected playing cards replacing said playing cards in the initial competing virtual poker hand that were designated to discard, wherein said held playing cards and said selected playing cards form a second competing virtual poker hand;

(j) causing the at least one display device to display a comparison of the players second poker hand to each of said displayed second competing virtual poker hands; and (k) providing the player said selected predetermined game outcome.

70. The method of claim 69, wherein at least one of said playing cards in said initial player poker hand is based on said selected predetermined game outcome.

71. The method of claim 69, wherein at least one of said playing cards in said initial competing virtual poker hand is based on said selected predetermined game outcome.

72. The method of claim 69, wherein a plurality of said playing cards in said initial player poker hand and a plurality of playing cards in said initial competing virtual poker hand are based on said selected predetermined game outcome.

73. The method of claim 69, wherein each of said playing cards in said initial player poker hand and each of said playing cards in said initial competing virtual poker hand are based on said selected predetermined game outcome.

74. The method of claim 69, which includes enabling the player to designate a plurality of said playing cards in said initial player poker hand to hold or to discard.

75. The method of claim 69, which includes enabling the player to designate each of said playing cards in said initial player poker hand to hold or to discard.

76. The method of claim 69, wherein steps (a) to (k) are provided to the player through a data network.

77. The method of claim 76, wherein the data network is an internet.

78. A method of operating a gaming device, for each play of a poker game, said method comprising:

(a) causing at least one processor to execute a plurality of instructions to determine a plurality of playing cards to form an initial player poker hand;

(b) causing at least one display device to display to a player the determined plurality of playing cards which form the initial player poker hand;

(c) causing the at least one display device to display an image of at least one competing virtual poker hand without determining or displaying which of said playing cards are in said competing virtual poker hand;

(d) enabling the player to designate at least one of said playing cards in said initial player poker hand to hold or to discard;

(e) causing the at least one processor to execute the plurality of instructions to determine and select another one of said playing cards for each playing card the player designated to discard;

(f) causing the at least one display device to display said selected playing cards replacing the playing cards in the initial player poker hand that the player designated to discard, wherein said held playing cards and said selected playing cards form a second player poker hand;

(g) for each displayed image of a competing virtual poker hand:

(i) causing the at least one processor to execute the plurality of instructions to determine a plurality of playing cards to include in said competing virtual poker hand, wherein said determination is based on said second player poker hand and a selected one of a plurality of predetermined game outcomes wherein each of said predetermined game outcomes is either a win outcome associated with a value or a loss outcome, and (ii) causing the at least one display device to display the determined plurality of playing cards of said competing virtual poker hand;

(h) if the selected predetermined game outcome is a loss outcome, causing the at least one display device to display at least one generated competitor placing a randomly determined amount of bets into a community pot;

(i) causing the at least one display device to display a comparison of the second player poker hand to each of said competing virtual poker hands; and (j) providing the player said selected predetermined game outcome.

79. The method of claim 78, which includes causing the at least one display device to display the at least one generated competitor placing bets into the community pot which equal a value associated with the selected predetermined game outcome if the selected predetermined game outcome is a win outcome.

80. The method of claim 78, wherein each of said playing cards provided to the player are independent of said selected predetermined game outcome.

81. The method of claim 78, wherein steps (a) to (j) are provided to the player through a data network.

82. The method of claim 81, wherein the data network is an internet.

83. A method of operating a gaming device, for each play of a poker game, said method comprising:

(a) causing at least one processor to execute a plurality of instructions to determine an initial player poker hand, wherein the initial player poker hand includes a plurality of playing cards;

(b) causing at least one display device to display the determined initial player poker hand;

(c) causing the at least one processor to execute the plurality of instructions to determine at least one initial competing virtual poker hand, wherein each initial competing virtual poker hand includes a plurality of playing cards;

(d) causing the at least one display device to display the determined at least one initial competing virtual poker hand;

(e) enabling the player to designate at least one of said playing cards in said initial player poker hand to hold or to discard;

(f) causing the at least one processor to execute the plurality of instructions to determine a second player poker hand, wherein said second player poker hand is based on said player's designations and a selected predetermined game outcome, said predetermined game outcome selected from a plurality of different predetermined game outcomes, wherein each of said predetermined game outcomes is either a win outcome associated with a value or a loss outcome;

(g) causing the at least one display device to display the determined second player poker hand;

(h) causing the at least one processor to execute the plurality of instructions to determine at least one second competing virtual poker hand, wherein each second competing virtual poker hand is based on said selected predetermined game outcome;

(i) causing the at least one display device to display the determined at least one second competing virtual poker hand;

(j) if the selected predetermined game outcome is a win outcome with an associated value, causing the at least one display device to display at least one generated competitor placing at least one bet into a community pot, wherein the bets placed into the community pot by the at least one generated competitor equal the value associated with the selected predetermined game outcome;

(k) causing the at least one display device to display a comparison of the second player poker hand to each of said second competing virtual poker hands; and (I) providing the player said selected predetermined game outcome.

84. The method of claim 83, which includes causing the at least one display device to display a randomly determined amount of bets placed into the community pot by the at least one generated competitor if the selected predetermined game outcome is a loss outcome.

85. The method of claim 84, wherein steps (a) to (I) are provided to the player through a data network.

86. The method of claim 85, wherein the data network is an internet.

* * * * *

UNITED STATES PATENT AND TRADEMARK OFFICE

CERTIFICATE OF CORRECTION

PATENT NO. : 7,837,545 B2
APPLICATION NO. : 10/934258
DATED : November 23, 2010
INVENTOR(S) : Blair, Jr. et al.

It is certified that error appears in the above-identified patent and that said Letters Patent is hereby corrected as shown below:

IN THE CLAIMS:

In Claim 12, Column 30, Line 45, replace “said display device” with --said at least one display device--.

In Claim 33, Column 33, Line 37, replace “said display device” with --said at least one display device--.

In Claim 54, Column 36, Line 8, replace “said display device” with --said at least one display device--.

In Claim 83, Column 40, Line 64, replace “(I)” with --(l)--.

Signed and Sealed this
Twenty-second Day of February, 2011

David J. Kappos
*Director of the United States Patent and Trademark Office*